US011326084B2

(12) United States Patent
Narahara

(10) Patent No.: US 11,326,084 B2
(45) **Date of Patent: *May 10, 2022**

(54) COLD STORAGE MATERIAL COMPOSITION AND USE THEREOF

(71) Applicant: KANEKA CORPORATION, Osaka (JP)

(72) Inventor: Risa Narahara, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,087

(22) Filed: Sep. 3, 2020

(65) Prior Publication Data

US 2020/0399516 A1 Dec. 24, 2020

Related U.S. Application Data

(63) Continuation of application No. PCT/JP2019/008232, filed on Mar. 1, 2019.

(30) Foreign Application Priority Data

Mar. 6, 2018 (JP) ............................ JP2018-039587

(51) Int. Cl.
*C09K 5/06* (2006.01)
*B65D 81/18* (2006.01)

(52) U.S. Cl.
CPC .............. *C09K 5/066* (2013.01); *B65D 81/18* (2013.01); *Y02E 60/14* (2013.01)

(58) Field of Classification Search
CPC . C09K 5/02; C09K 5/06; C09K 5/063; C09K 5/066; B65D 81/18; F28D 20/0034; F28D 20/021; Y02E 60/14; Y02E 60/147
See application file for complete search history.

(56) References Cited

U.S. PATENT DOCUMENTS 4,397,752 A 8/1983 Kimura et al.
4,637,888 A * 1/1987 Lane ...................... C09K 5/063 252/70

(Continued)

FOREIGN PATENT DOCUMENTS

CN 1362462 A 8/2002
CN 102277137 A 12/2011

(Continued)

OTHER PUBLICATIONS

Haghighi et al. ("Freezing point depression of electrolyte solutions: experimental measurements and modeling using the cubic-plus-association equation of state," Ind. Eng. Chem. Res., 2008, 47, 3983-3989) (Year: 2008).*

(Continued)

*Primary Examiner* — Matthew R Diaz
(74) *Attorney, Agent, or Firm* — Osha Bergman Watanabe & Burton LLP

(57) ABSTRACT

A cold storage material composition is provided allowing for temperature maintenance of a temperature control target article in various control temperature ranges in a range of −75° C. to −55° C. and being capable of solidifying within a given period of time and (ii) a technique of using the cold storage material composition. Also provided is a cold storage material composition including calcium ions, chloride ions, bromide ions, and ammonium ions in respectively specific amounts, relative to 100 mol of water, and having a melting temperature in a range of −75° C. to −55° C.

7 Claims, 5 Drawing Sheets

(56) References Cited

U.S. PATENT DOCUMENTS

| | | | | | |
|---|---|---|---|---|---|
| 4,715,978 | A * | 12/1987 | Yano | C09K 5/063 252/70 |
| 5,348,080 | A | 9/1994 | Kuroda et al. | |
| 5,567,346 | A * | 10/1996 | Kakiuchi | C09K 5/063 252/70 |
| 5,860,282 | A | 1/1999 | Liberman et al. | |
| 6,086,782 | A | 7/2000 | Hsu et al. | |
| 6,469,085 | B1 | 10/2002 | Mizutani | |
| 6,513,516 | B2 * | 2/2003 | Sabin | B65D 81/3484 62/4 |
| 7,967,999 | B2 | 6/2011 | Tomura | |
| 9,039,924 | B2 * | 5/2015 | Leavitt | C09K 5/066 252/70 |
| 9,096,787 | B2 | 8/2015 | Rowley et al. | |
| 9,845,420 | B2 * | 12/2017 | Machida | C09K 5/066 |
| 10,717,910 | B2 | 7/2020 | Katano | |
| 2005/0133757 | A1 * | 6/2005 | Umemoto | C09K 5/066 252/70 |
| 2014/0318158 | A1 | 10/2014 | Shuntich | |
| 2016/0153273 | A1 * | 6/2016 | Nguyen | C09K 8/88 166/280.1 |
| 2018/0105728 | A1 * | 4/2018 | Katano | C09K 5/06 |
| 2020/0248057 | A1 | 8/2020 | Sezukuri et al. | |
| 2020/0399516 | A1 | 12/2020 | Narahara | |
| 2021/0062058 | A1 * | 3/2021 | Kamura | C09K 5/063 |

FOREIGN PATENT DOCUMENTS

| | | | | | |
|---|---|---|---|---|---|
| CN | 102732227 | A | | 10/2012 | |
| CN | 102746829 | A | | 10/2012 | |
| CN | 104449589 | A | | 3/2015 | |
| CN | 104726071 | A | | 6/2015 | |
| CN | 104893673 | A | | 9/2015 | |
| CN | 106566480 | A | | 4/2017 | |
| CN | 107556972 | A | * | 1/2018 | |
| JP | S57-153077 | A | | 9/1982 | |
| JP | S62-30182 | A | | 2/1987 | |
| JP | H02-238277 | A | | 9/1990 | |
| JP | H03-281593 | A | | 12/1991 | |
| JP | H05-39988 | A | | 2/1993 | |
| JP | H06-50686 | A | | 2/1994 | |
| JP | H06-158362 | A | | 6/1994 | |
| JP | H07-26250 | A | | 1/1995 | |
| JP | H1135933 | A | | 2/1999 | |
| JP | H11-349936 | A | | 12/1999 | |
| JP | H11335660 | A | | 12/1999 | |
| JP | 2000-144123 | A | | 5/2000 | |
| JP | 2000-351963 | A | | 12/2000 | |
| JP | 2002-071248 | A | | 3/2002 | |
| JP | 2002-139272 | A | | 5/2002 | |
| JP | 2002-265936 | A | | 9/2002 | |
| JP | 2002-371269 | A | | 12/2002 | |
| JP | 2003-041242 | A | | 2/2003 | |
| JP | 2003-171657 | A | | 6/2003 | |
| JP | 2004-307772 | A | | 11/2004 | |
| JP | 2006-335940 | A | | 12/2006 | |
| JP | 2008-134005 | A | | 6/2008 | |
| JP | 2011-196580 | A | | 10/2011 | |
| JP | 2014-070141 | A | | 4/2014 | |
| JP | 2015-067651 | A | | 4/2015 | |
| JP | 2017-128622 | A | | 7/2017 | |
| JP | 2017128622 | A | * | 7/2017 | |
| WO | 2014091938 | A1 | | 6/2014 | |
| WO | 2016/204284 | A1 | | 12/2016 | |
| WO | WO-2016204284 | A1 | * | 12/2016 | C09K 5/066 |
| WO | 2018-180506 | A1 | | 10/2018 | |
| WO | WO-2019151492 | A1 | * | 8/2019 | C09K 5/06 |

OTHER PUBLICATIONS

Schmit et al. ("Calorimetric and theoretical determination of the concentration dependent enthalpy change around CaBr2-6H20," Thermochimica Acta 609, 2015, 20-30) (Year: 2015).*

English language machine translation of Hai et al. (CN 107556972 A) (Year: 2018).*

Extended European Search Report issued in corresponding European Application No. 18775582.2; dated Nov. 27, 2020 (8 pages).

United States Office Action issued in Domestic U.S. Appl. No. 16/498,305; dated Sep. 28, 2020 (13 pages).

United States Office Action issued in Domestic U.S. Appl. No. 16/498,305, dated Feb. 11, 2021 (21 pages).

Notice of Allowance issued in the counterpart U.S. Appl. No. 16/498,305, dated May 17, 2021 (9 pages).

International Search Report issued in International Application No. PCT/JP2016/068152; dated Jul. 19, 2016 (2 pages).

International Preliminary Report on Patentability issued in International Application No. PCT/JP2016/068152; dated Dec. 28, 2017 (8 pages).

S.A. Ketcham et al., "Manual of Practice for an Effective Anti-Icing Program a Guide for Highway Winter Maintenance Personnel Prepared for the Federal Highway Administration by US Army cold Regions," Feb. 22, 1996 (40 pages).

Office Action issued in corresponding European Application No. 16811758.8; dated Jun. 23, 2020 (8 pages).

United States Office Action issued in Domestic U.S. Appl. No. 15/841,774; dated Dec. 19, 2019 (6 pages).

International Search Report issued in International Application No. PCT/JP2018/010066, dated May 1, 2018 (2 pages).

Written Opinion issued in International Application No. PCT/JP2018/010066, dated May 1, 2018 (4 pages).

Office Action issued in corresponding Chinese Application No. 201880021699.6, dated Feb. 3, 2020 (21 pages).

International Search Report issued in International Application No. PCT/JP2019/008232, dated May 14, 2019 (2 pages).

Written Opinion issued in International Application No. PCT/JP2019/008232, dated May 14, 2019 (11 pages).

English Translation of International Preliminary Report on Patentability issued in International Application No. PCT/JP2018/010066, dated Jul. 1, 2019 (4 pages).

Office Action issued in the counterpart Chinese Patent Application No. 201980017169.9, dated Apr. 16, 2021 (16 pages).

Extended European Search Report issued in corresponding European Patent Application No. EP 19763401.7 dated Oct. 22, 2021 (8 pages).

* cited by examiner

COLD STORAGE MATERIAL COMPOSITION AND USE THEREOF

TECHNICAL FIELD

Embodiments in accordance with the present disclosure generally relate to (i) a cold storage material composition for controlling a temperature of an article and (ii) a technique for using the cold storage material composition. More specifically, the present disclosure relates to a cold storage material composition, a cold storage material including the cold storage material composition, a transport container including the cold storage material, a method of producing the cold storage material composition, and a method of using the cold storage material composition.

BACKGROUND

Various heat storage material compositions or cold storage material compositions using latent heat have conventionally been known (see, for example, Patent Literature 1 and Patent Literatures 5 to 7) and have been used in a variety of fields including a heating and cooling system and storage and transportation of articles.

For example, some of pharmaceutical products, specimens, and the like used in medical facilities such as hospitals and the like and some of foods and the like available in supermarkets and the like need to be kept at a constant temperature in a given temperature range for a given period of time during transportation or storage so that their qualities are maintained.

Examples of a method of transporting or storing articles such as pharmaceutical products, medical devices, cells, specimens, organs, chemical substances, foods, and the like in a state in which the articles are kept at a constant temperature conventionally include the following method: That is, a method in which (i) a cold storage material, which has been frozen and solidified in advance, is placed in a container having a thermal insulation property to prepare a temperature keeping container and (ii) an article housed in the temperature keeping container is transported or stored in a state in which the temperature of the article is maintained by using latent heat of melting of the cold storage material. To maintain the above-described article to be kept at a constant temperature (hereinafter also referred to as "temperature control target article") in the given temperature (hereinafter also referred to as "control temperature") range for a long period of time, a cold storage material having a melting temperature in the given temperature range is preferably used.

Some of the temperature control target articles need to be transported at control temperatures of −30° C. or lower, preferably −50° C. or lower, more preferably −70° C. or lower, and other temperature. To meet these control temperatures, dry ice has conventionally been used as a cold storage material. Dry ice is inexpensive and versatile. However, dry ice has the problem of, for example, being treated as a hazardous material in a case of transportation, air transportation in particular, and being limited in the amount loaded when used as a cold storage material for use in a temperature keeping container (transport container). This is because dry ice expands in volume when sublimating (phase transition from a solid to a gas).

As a cold storage material that can be used in a low temperature range and does not involve phase transition to a gas, a cold storage material composition using an aqueous inorganic salt solution containing water and a specific inorganic salt has been disclosed.

For example, Patent Literature 2 discloses a cold storage material composition having a melting temperature of −47.5° C. This cold storage material composition is obtained by mixing 15% by weight (after mixing, 1.3 mol %) of calcium chloride and 5% by weight (after mixing, 0.5 mol %) of magnesium chloride into water.

Further, Patent Literature 3 discloses a cold storage material composition containing 6 mol of calcium chloride (5.6 mol % relative to the total molar quantity of the cold storage material composition) and 2 mol of sodium chloride (1.9 mol % relative to the total molar quantity of the cold storage material composition) relative to 100 mol of water, and containing, as a thickener, 1% by weight of high viscosity-type hydroxyethyl cellulose relative to the total weight of the cold storage material composition, the cold storage material composition having a melting temperature of −54.7° C.

Further, Patent Literature 4 discloses a cold storage material in a slurry which is obtained in such a manner that an aqueous solution in which inorganic salt is dissolved in a concentration equal to or below a solute concentration at an eutectic point is cooled to a temperature which is lower than a freezing start temperature and is higher than the eutectic point so that an ice is partially precipitated out of the aqueous solution, the cold storage material having fluidity and undergoing a phase change (melting) in a freezing temperature range (−18° C. or lower).

PATENT REFERENCES

[Patent Reference 1]
Japanese Patent Application Publication Tokukai No. 2004-307772
[Patent Reference 2]
Japanese Patent Application Publication Tokukai No. 2002-371269
[Patent Reference 3]
International publication No. WO2016/204284
[Patent Reference 4]
Japanese Patent Application Publication Tokukaihei No. 7-26250
[Patent Reference 5]
Japanese Patent Application Publication Tokukaihei No. 6-158362
[Patent Reference 6]
Japanese Patent Application Publication Tokukai No. 2011-196580
[Patent Reference 7]
Japanese Patent Application Publication Tokukaishou No. 62-30182

SUMMARY

In view of the remaining desirability to improve the above-described cold storage material composition one or more embodiments of the present disclosure provide (i) a novel cold storage material composition allowing for temperature maintenance of a temperature control target article in various control temperature ranges in a range of −75° C. to −55° C. and being capable of solidifying within a given period of time and (ii) a technique of using the cold storage material composition.

According to one or more embodiments, a cold storage material composition having a melting temperature in a range of −75° C. to −55° C. and being capable of solidifying within a given period of time may be obtained by containing, relative to water, calcium ions, chloride ions, bromide ions, and ammonium ions in respectively specific amounts.

That is, a cold storage material composition according to one or more embodiments of the present disclosure may include 0.1 mol to 20.0 mol of calcium ions, 0.1 mol to 28.0 mol of chloride ions, 0.1 mol to 20.0 mol of bromide ions, and 0.01 mol to 10.00 mol of ammonium ions, relative to 100 mol of water, the cold storage material composition having a melting temperature in a range of −75° C. to −55° C.

Further, a method of producing a cold storage material composition according to one or more embodiments of the present disclosure may include a mixing step of forming a mixture in which water, calcium chloride, calcium bromide, and ammonium chloride are mixed.

Still further, a method of producing a cold storage material composition according to one or more embodiments of the present disclosure may include a mixing step of forming a mixture in which water, calcium chloride, and ammonium bromide are mixed.

Yet further, a method of producing a cold storage material composition according to one or more embodiments of the present disclosure may include a mixing step of forming any one of the following mixtures (A) through (E): (A) a mixture in which water, ammonium chloride, and calcium bromide are mixed; (B) a mixture in which water, calcium chloride, a bromide salt, and an ammonium salt are mixed; (C) a mixture in which water, calcium bromide, a chloride salt, and an ammonium salt are mixed; (D) a mixture in which water, ammonium chloride, a calcium salt, and a bromide salt are mixed; and (E) water, a calcium salt, a chloride salt, a bromide salt, and an ammonium salt.

Further, a method of using a cold storage material composition may include: a solidifying step of keeping a cold storage material composition at a temperature lower than a melting temperature of the cold storage material composition to solidify the cold storage material composition, the cold storage material composition including water, calcium ions, chloride ions, bromide ions, and ammonium ions; and a maintaining step of maintaining part or whole of a target object at not less than −75° C. to not more than −55° C. under an environment with a temperature which exceeds the melting temperature of the cold storage material composition, the cold storage material composition including 0.1 mol to 20.0 mol of the calcium ions, 0.1 mol to 28.0 mol of the chloride ions, 0.1 mol to 20.0 mol of the bromide ions, and 0.01 mol to 10.00 mol of the ammonium ions, relative to 100 mol of the water.

According to one or more embodiments of the present disclosure, it is possible to provide a cold storage material composition and others allowing for temperature maintenance of a temperature control target article in various control temperature ranges in a range of −75° C. to −55° C. and being capable of solidifying within a given period of time

BRIEF DESCRIPTION OF DRAWINGS

FIG. 1(*b*) is a graph plotting a change over time in temperature of a cold storage material composition when the cold storage material composition in a melted state in accordance with an embodiment of the present invention was placed in a thermostatic bath, and the temperature of the thermostatic bath was then decreased from room temperature (e.g., 25° C.) at a constant rate of temperature decrease, FIG. 1(*c*) is a graph plotting a change over time in temperature of a cold storage material composition when the cold storage material composition in a melted state according to one or more embodiments of the present disclosure was placed in a thermostatic bath, the temperature of the thermostatic bath was then decreased from room temperature (e.g., 25° C.) to −80° C. at a constant rate of temperature decrease and was subsequently maintained at −80° C. for a certain period of time, and thereafter, the temperature of the thermostatic bath was increased from −80° C. at a constant rate of temperature increase.

FIG. 2(*b*) is an exploded perspective view schematically illustrating an example of a transport container according to one or more embodiments of the present disclosure.

FIG. 3(*b*) is a cross-sectional view schematically illustrating a plane taken along the line A-A in FIG. 3(*a*).

DETAILED DESCRIPTION

Figure 1A:
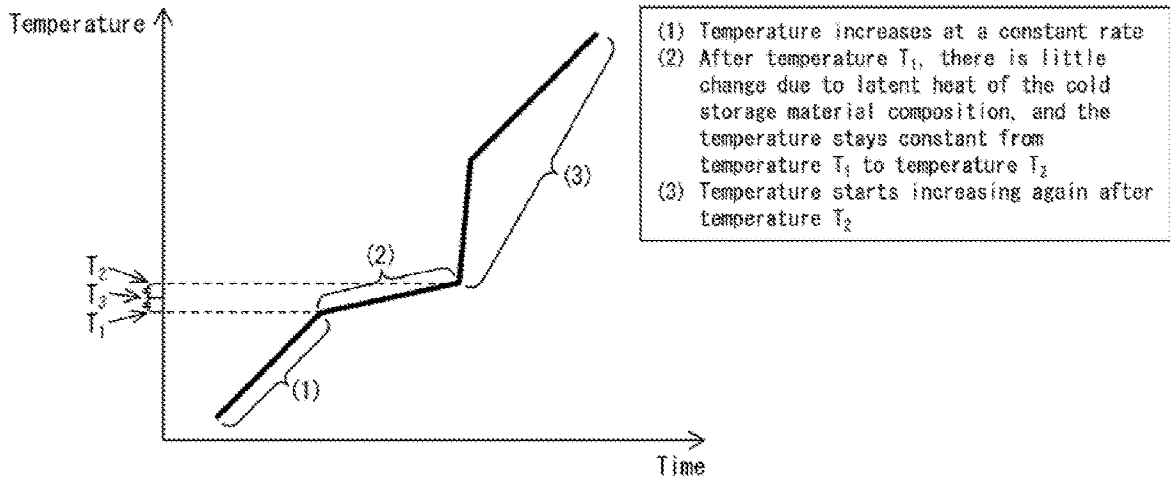
FIG. 1(*a*) is a graph plotting a change over time in temperature of a cold storage material composition when the cold storage material composition in a solidified state in accordance with an embodiment of the present invention was placed in a thermostatic bath, and the temperature of the thermostatic bath was then increased from a cryogenic temperature (e.g., −80° C.) at a constant rate of temperature increase.

The following description will discuss embodiments of the present disclosure. The present disclosure is, however, not limited to such embodiments. The present disclosure is not limited to any configurations described below, and can be altered in various ways within the scope of the claims. The technical scope of the present disclosure also encompasses embodiments and examples derived from a proper combination of technical means disclosed in different embodiments and examples. Furthermore, a new technical feature can be formed by combining technical means disclosed in differing embodiments. All academic and patent documents cited in the present specification are incorporated herein by reference. Further, any numerical range expressed as "A to B" herein means "not less than A (A or more) and not more than B (B or less)" unless otherwise specified.

[1. Technical Idea]

Some embodiments herein are directed to a novel cold storage material composition having a melting temperature in a range of −75° C. to −55° C. and being capable of solidifying within a given period of time by containing, relative to water, calcium ions, chloride ions, bromide ions, and ammonium ions in respectively specific amounts in a state of having a temperature equal to or higher than a melting temperature and in a liquefied state. Addition of ammonium ions was found to enable adjustment of a solidifying time of a cold storage material composition.

Further, it was found that appropriately changing the amount of ammonium ions in a cold storage material composition enables adjustment of a solidification start temperature and a solidification time.

[2. Cold Storage Material Composition]

A cold storage material composition according to one or more embodiments of the present disclosure includes 0.1 mol to 20.0 mol of calcium ions ($Ca^{2+}$), 0.1 mol to 28.0 mol of chloride ions ($Cl^-$), 0.1 mol to 20.0 mol of bromide ions ($Br^-$), and 0.01 mol to 10.00 mol of ammonium ions ($NH_4^+$) relative to 100 mol of water, the cold storage material composition having a melting temperature in a range of −75° C. to −55° C. With the above configuration, the cold storage material composition according to one or more embodiments of the present disclosure has the following advantages (1) to (4):

Advantage (1): Since the melting temperature of the cold storage material composition can be adjusted to −75° C. to −55° C. with good repeatability and stability, the cold storage material composition allows for (i) temperature maintenance of a temperature control target article in various control temperature ranges in a range of −75° C. to −55° C. and (ii) storage or transportation of the temperature control target article in the various control temperature ranges in the range of −75° C. to −55° C.

Advantage (2): The cold storage material composition can be used as a substitute for dry ice.

Advantage (3): The cold storage material composition is easy to handle.

Advantage (4): The cold storage material composition can be solidified in a short time.

In the present disclosure, "a cold storage material composition according to one or more embodiments of the present disclosure" can also be referred to simply as "the present cold storage material composition". That is, the term "the present cold storage material composition" is intended to mean an embodiment of the cold storage material composition according to the present disclosure.

The present cold storage material composition is usable as a cold storage material of a latent heat type since the cold storage material composition absorbs thermal energy during a phase transition from a solidified (solid) state to a molten (liquid) state (in other words, during melting). The present cold storage material composition can also be regarded as a melt-type latent heat cold storage material composition. The molten state encompasses a "gel-like form" (described later).

The types and amounts of ions contained in the present cold storage material composition are intended to mean types and amounts of ions present in the present cold storage material composition in a state of having a temperature equal to or higher than a melting temperature and in a liquefied state. The "liquefied state" encompasses a "gelled state". The "gelled" will be detailed later. The types and amounts of ions contained in the present cold storage material composition can be measured, for example, at room temperature (e.g., 30° C.) by ion chromatography. The measurement can be carried out by any publicly-known method. Further, the following will consider a case where only a mixing step of forming a mixture containing specific ions that can dissociate at room temperature is carried out (that is, a cooling step described later is not carried out, and specific components in the cold storage material composition are not removed) by, for example, a method such as a method (1) or (2) below so that a cold storage material composition is produced. Method (1) of mixing specific compounds which can dissociate at room temperature and water; or method (2) of mixing aqueous solutions containing specific compounds which can dissociate at room temperature. In such a case, the types and amounts of ions contained in a resulting cold storage material composition may be determined through theoretical calculation from the chemical formulae of the specific compounds used in the mixing step and the added amounts of the specific compounds used in the mixing step. In the present specification, the term "dissociate" is intended to mean "electrolytically dissociate" and "ionize". The terms "dissociate", "electrolytically dissociate", and "ionize" are interchangeable.

Further, the present cold storage material composition can contain compounds, such as a calcium salt, a chloride salt, a bromide salt, and an ammonium salt, which do not dissociate (not ionized) at 30° C. In a case where the compounds contained in the present cold storage material composition do not dissociate at 30° C., the amounts of the compounds contained in the present cold storage material composition do not affect the amounts of calcium ions, chloride ions, bromide ions, and ammonium ions contained in the present cold storage material composition even when the compounds contain a calcium element, a chlorine element, a bromine element, and others.

The following description will first discuss components of the present cold storage material composition, and will then discuss physical properties (e.g., a melting temperature) of the present cold storage material composition and a method of producing the present cold storage material composition.

[2-1. Components of Cold Storage Material Composition]

The present cold storage material composition need only contain 0.1 mol to 20.0 mol of calcium ions, 0.1 mol to 28.0 mol of chloride ions, 0.1 mol to 20.0 mol of bromide ions, and 0.01 mol to 10.00 mol of ammonium ions, relative to 100 mol of water, and other configurations of the present cold storage material composition are not limited to any particular ones. With the above configuration, the present cold storage material composition has the above-described advantages (1) to (4).

A cold storage material composition can achieve the above-described advantage (4) by containing ammonium ions as described in the [1. Technical idea] section above. This is considered to be ascribable to the cause below (however, the present disclosure is not particularly limited to the cause (principle) below). Part of the chloride ions and part or whole of the ammonium ions in the cold storage material composition form ammonium chloride. It is presumed that the ammonium chloride acts as a "core" when the cold storage material composition solidifies so that the solidification time of the cold storage material composition is shortened or so that the solidification start temperature of the cold storage material composition is increased and the solidification time of the cold storage material composition is shortened.

Thus, it can also be said that, in the present cold storage material composition, the ammonium chloride which is composed of part of chloride ions and part or whole of ammonium ions functions as a "crystal nucleating agent" in a commonly used term. Thus, it can also be said that a cold storage material composition according to one or more embodiments is a cold storage material composition that contains water, calcium ions, chloride ions, bromide ions, and ammonium chloride, which is used as a crystal nucleating agent, in respective predetermined amounts.

The present cold storage material composition may contain a commonly known crystal nucleating agent, if necessary, as well as ammonium chloride. Examples of the commonly known crystal nucleating agent other than ammonium chloride include calcium carbonate, calcium silicate, ammonium chloride, sodium tetraborate, and magnesium chloride. The crystal nucleating agent is not limited to the above-described crystal nucleating agents, provided that it has the effect of reproducing the melting temperature at the time of repeated use. Various crystal nucleating agents can be contained in the present cold storage material composition. These crystal nucleating agents can be used individually or in combination. Further, among these crystal nucleating agents, calcium carbonate is preferable in terms of ease of handling since the calcium carbonate is used as a choke or a food additive.

The present cold storage material composition contains, relative to 100 mol of water, preferably 0.1 mol to 20.0 mol of calcium ions, preferably 1.0 mol to 28.0 mol of chloride ions, preferably 1.0 mol to 20.0 mol of bromide ions, and/or preferably 0.01 mol to 10.00 mol of ammonium ions. The present cold storage material composition contains, relative to 100 mol of water, more preferably 4.0 mol to 15.0 mol of calcium ions, more preferably 4.0 mol to 20.0 mol of chloride ions, more preferably 4.0 mol to 16.0 mol of bromide ions, and/or more preferably 0.50 mol to 8.00 mol of ammonium ions. The present cold storage material composition contains, relative to 100 mol of water, even more preferably 5.0 mol to 13.0 mol of calcium ions, even more preferably 5.0 mol to 15.0 mol of chloride ions, even more preferably 5.0 mol to 13.0 mol of bromide ions, and/or even more preferably 1.00 mol to 6.00 mol of ammonium ions. The present cold storage material composition contains, relative to 100 mol of water, further more preferably 6.0 mol to 11.0 mol of calcium ions, further more preferably 6.0 mol to 13.0 mol of chloride ions, further more preferably 6.0 mol to 11.0 mol of bromide ions, and/or further more preferably 2.00 mol to 5.00 mol of ammonium ions. The present cold storage material composition contains, relative to 100 mol of water, most preferably 7.0 mol to 10.0 mol of calcium ions, most preferably 7.0 mol to 12.0 mol of chloride ions, most preferably 7.0 mol to 10.0 mol of bromide ions, and/or most preferably 2.50 mol to 4.00 mol of ammonium ions. With the above constituents, the present cold storage material composition has, for example, the advantage of exhibiting the fixed-temperature maintaining performance with higher stability and higher repeatability and the advantage of being able to solidify in a shorter time.

The present cold storage material composition preferably contains 2.50 mol to 4.00 mol of ammonium ions, relative to 100 mol of water, from the viewpoint of allowing the cold storage material composition to solidify in a further shorter time.

In the present cold storage material composition, a molar ratio of calcium ions, chloride ions, bromide ions, and ammonium ions (molar quantity of calcium ions:molar quantity of chloride ions:molar quantity of bromide ions: molar quantity of ammonium ions) contained in the present cold storage material composition is preferably 1:0.005 to 100:0.05 to 100:0.0005 to 50, more preferably 1:0.01 to 100:0.01 to 100:0.0005 to 50, even more preferably 1:0.1 to 100:0.1 to 100:0.0005 to 50, further more preferably 1:0.3 to 5:0.3 to 5:0.07 to 2, most preferably 1:0.7 to 1.8:0.7 to 1.5:0.2 to 0.6. With the above constituents, the cold storage material composition has, for example, the advantage of exhibiting the fixed-temperature maintaining performance with higher stability and higher repeatability and the advantage of being able to solidify in a shorter time.

In the present cold storage material composition, an original form(s) of the calcium ions (in other words, what the calcium ions are derived from) is/are not particularly limited. Examples of the original form(s) of the calcium ions include calcium salts such as calcium fluoride, calcium chloride, calcium bromide, calcium iodide, calcium oxide, calcium sulfide, calcium nitride, calcium phosphide, calcium carbide, and calcium boride. These calcium salts can be used individually or in combination. In the present cold storage material composition, the calcium ions are preferably derived from calcium chloride and/or calcium bromide, in terms of, for example, excellent handleability and safety of the compounds and inexpensiveness of the compounds. In a case where the original form(s) of the calcium ions is/are calcium chloride and/or calcium bromide, a resulting cold storage material composition has the advantage of exhibiting the fixed-temperature maintaining performance with higher stability and higher repeatability and the advantage of undergoing low volume expansion.

In the present cold storage material composition, an original form(s) of the chloride ions (in other words, what the chloride ions are derived from) is/are not particularly limited. Examples of the original form(s) of the chloride ions include chloride salts such as sodium chloride, calcium chloride, ammonium chloride, lithium chloride, potassium chloride, magnesium chloride, zinc chloride, and aluminum chloride. These chloride salts can be used individually or in combination. In the present cold storage material composition, the chloride ions are preferably derived from calcium chloride, in terms of, for example, excellent handleability of the compounds and inexpensiveness of the compounds. In a case where the original form(s) of the chloride ions is/are calcium chloride, a resulting cold storage material composition has the advantage of exhibiting the fixed-temperature maintaining performance with higher stability and higher repeatability and the advantage of undergoing low volume expansion. Calcium chloride can be commonly used as a snow melting agent.

In the present cold storage material composition, an original form(s) of the bromide ions (in other words, what the bromide ions are derived from) is/are not particularly limited. Examples of the original form(s) of the bromide ions include bromide salts such as ammonium bromide, potassium bromide, sodium bromide, calcium bromide, lithium bromide, magnesium bromide, and zinc bromide. These bromide salts can be used individually or in combination. In the present cold storage material composition, the bromide ions are preferably derived from at least one bromide salt selected from the group consisting of ammonium bromide, potassium bromide, sodium bromide, and calcium bromide, and are more preferably derived from calcium bromide and/or ammonium bromide, in terms of, for example, excellent handleability and safety of the compounds. With the above constituents, a resulting cold storage material composition has the advantage of exhibiting the fixed-temperature maintaining performance with higher stability and higher repeatability and the advantage of undergoing low volume expansion. Further, calcium bromide is safe enough to be used as a raw material for pharmaceutical products and is easy to handle. Thus, the bromide ions of the present cold storage material composition are even more preferably derived from calcium bromide.

In the present cold storage material composition, an original form(s) of the ammonium ions (in other words, what the ammonium ions are derived from) is/are not particularly limited. Examples of the original form(s) of the ammonium ions include ammonium salts such as ammonium chloride, ammonium bromide, ammonium iodide, and ammonium sulfate. These ammonium salts can be used individually or in combination. In the present cold storage material composition, the ammonium ions are preferably derived from ammonium chloride and/or ammonium bromide, in terms of, for example, excellent handleability and safety of the compounds. In a case where the original form(s) of the ammonium ions is/are ammonium chloride and/or ammonium bromide, a resulting cold storage material composition has the advantage of exhibiting the fixed-temperature maintaining performance with higher stability and higher repeatability, the advantage of undergoing low volume expansion, and the advantage of being able to solidify in a shorter time.

Examples of a combination of compounds to produce the present cold storage material composition include the following combinations: (i) calcium chloride, calcium bromide, and ammonium chloride; (ii) calcium chloride and ammonium bromide; (iii) ammonium chloride and calcium bromide; (iv) calcium chloride, any bromide salt, and any ammonium salt; (v) calcium bromide, any chloride salt, and any ammonium salt; (vi) ammonium chloride, any calcium salt, and any bromide salt; and (vii) any calcium salt, any chloride salt, any bromide salt, and any ammonium salt.

By blending the compounds in any of the above compound combinations and in respectively specific amounts, it is possible to prepare the present cold storage material composition.

Note that, as described above, the present cold storage material composition has the advantage of being able to solidify in a short time, thanks to the ammonium chloride which is composed of (i) part of chloride ions and (ii) part or whole of ammonium ions both of which are contained in the cold storage material composition. The compounds (e.g., inorganic salt) blended in a cold storage material composition can turn into ions in the cold storage material composition. Thereafter, ammonium chloride can be formed from chloride ions and ammonium ions present in the cold storage material composition. For example, in a case where a cold storage material composition is prepared by mixing water, calcium chloride, and ammonium bromide in respective predetermined amounts, calcium chloride can dissociate into chloride ions and calcium ions while the ammonium bromide can dissociate into bromide ions and ammonium ions. From the chloride ions and ammonium ions thus formed, ammonium chloride can be formed. That is, it is not necessary to blend ammonium chloride in the process of producing the present cold storage material composition.

The following will consider a case where, in the present cold storage material composition, the chloride ions are derived from chloride salt and the bromide ions are derived from bromide salt. An added amount of chloride salt in the cold storage material composition is not limited to any particular amount. However, the added amount of the chloride salt in the cold storage material composition is preferably in a range of 0.1 mol to 10.0 mol, more preferably in a range of 0.5 mol to 10.0 mol, even more preferably in a range of 1.0 mol to 10.0 mol, further more preferably in a range of 1.0 mol to 7.0 mol, still further more preferably in a range of 1.0 mol to 6.0 mol, and particularly preferably in a range of 3.0 mol to 5.0 mol, relative to 100 mol of water contained in the cold storage material composition. In a case where the added amount of the chloride salt in the cold storage material composition falls within any of the above ranges, a resulting cold storage material composition has the advantage of showing a melting temperature of −75° C. to −55° C. with higher repeatability and higher stability and the advantage of being easier to handle. In the present specification, the term "added amount" can also be expressed as "used amount".

An added amount of bromide salt in the cold storage material composition is not limited to any particular amount. However, the added amount of the bromide salt in the cold storage material composition is preferably in a range of 0.1 mol to 10.0 mol, more preferably in a range of 1.0 mol to 10.0 mol, even more preferably in a range of 1.0 mol to 9.0 mol, further more preferably in a range of 2.0 mol to 8.0 mol, and particularly preferably in a range of 3.0 mol to 6.0 mol, relative to 100 mol of water contained in the cold storage material composition. In a case where the added amount of the bromide salt in the cold storage material composition falls within any of the above ranges, a resulting cold storage material composition has the advantage of showing a melting temperature of −75° C. to −55° C. with higher repeatability and higher stability and the advantage of being easier to handle.

A molar ratio between the added amount of the chloride salt and the added amount of the bromide salt (bromide salt/chloride salt) in the cold storage material composition is not limited to any particular molar ratio. However, the molar ratio between the added amount of the chloride salt and the added amount of the bromide salt (bromide salt/chloride salt) in the cold storage material composition is preferably in a range of 0.1 to 10.0, more preferably in a range of 0.5 to 4.0, even more preferably in a range of 0.6 to 2.0, and particularly preferably in a range of 0.7 to 1.5. In a case where the added amount of the chloride salt and the added amount of the bromide salt in the cold storage material composition falls within any of the above ranges, a resulting cold storage material composition has the advantage of showing a melting temperature of −75° C. to −55° C. with higher repeatability and higher stability and the advantage of being easier to handle.

In the present cold storage material composition, in a case where the calcium ions and chloride ions are derived from calcium chloride, a molar ratio between water and calcium chloride added in the present cold storage material composition (water/calcium chloride) is not limited to any particular ratio, but is preferably in a range of 10 to 1000, and more preferably in a range of 10 to 100, in terms of easy handling of the present cold storage material composition.

The following will consider a case where, in the present cold storage material composition, the chloride ions are derived from calcium chloride, the bromide ions are derived from calcium bromide, and the calcium ions are derived from the calcium chloride and the calcium bromide. In such a case, a molar ratio between the added amount of the calcium chloride and the added amount of the calcium bromide in the present cold storage material composition (calcium bromide/calcium chloride) is not limited to any particular ratio, but is preferably in a range of 0.1 to 10 in terms of easy handling.

In one or more embodiments of the present disclosure, compounds added in a cold storage material composition are not limited to any particular compounds. However, the compounds added in a cold storage material composition are preferably ones that generates no harmful fumes and/or do not have the properties of a strong alkali, a strong acid, and the like. The above configuration has an advantage of offering easy production and easy handling of the present cold storage material composition. In other words, the phrase "easy handling" as used herein is intended to mean that substances (compounds) contained in a cold storage material composition and the cold storage material composition itself are in no danger of generating harmful fumes and/or do not have the properties of a strong alkali, a strong acid, and the like. For example, Patent Literature 4 describes zinc chloride and potassium hydroxide as inorganic salts having an eutectic point of −60° C. or lower when mixed with water. However, since zinc chloride can generate harmful fumes, and potassium hydroxide is strongly alkali, it can be said that zinc chloride and potassium hydroxide are difficult-to-handle compounds.

The water in the present cold storage material composition may be water usable as drinking water and may be, for example, soft water, hard water, pure water, and the like water.

The cold storage material composition in accordance with one or more embodiments of the present disclosure is, as described later, charged into a container, a bag, or the like so as to be formed into a cold storage material. The cold storage material can be used while being placed in a transport container. However, in a case where a container or the like that shapes the cold storage material breaks during transportation or conveyance, the cold storage material composition charged in the container or the like leaks out of the container or the like. In such a case, there is concern about, for example, the possibility of contaminating a temperature control target article and making the temperature control target article unusable.

Therefore, in order to minimize spillage of the cold storage material composition even in the event of breakage of a container or the like charged with the cold storage material composition during transportation or conveyance, the cold storage material composition according to one ore more embodiments contains a thickener so that the cold storage material composition is in a solid form (including a gel-like form).

The thickener is not particularly limited. Examples of the thickener include water-absorbing resin (such as starches, acrylates, povals, carboxymethyl celluloses, and the like), attapulgite clay, gelatin, agar, silica gel, xanthane gum, gum arabic, guar gum, carrageenan, cellulose, konjac, and the like.

The thickener can be an ionic thickener or a nonionic thickener. It is preferable to select, as the thickener, a nonionic thickener that does not affect the ions contained in the cold storage material composition. Examples of the nonionic thickener include guar gum, dextrin, polyvinyl pyrrolidone, hydroxyethyl cellulose, and the like. Among these nonionic thickeners, hydroxyethyl cellulose which is excellent in gel stability and environmental adaptability is particularly preferable.

Calcium ions, chloride ions, bromide ions, and ammonium ions contained in the present cold storage material composition can form a salt over time due to a change in temperature, depending on the concentrations at which the calcium ions, chloride ions, bromide ions, and ammonium ions are contained in the present cold storage material composition. The formed salt can be deposited. In a case where the present cold storage material composition contains the thickener, the thickener not only allows the cold storage material composition to be in the gel-like form but also allows ions dissolved in the cold storage material composition to be effectively dispersed. This makes it possible to prevent deposition of the salt.

In a case where the present cold storage material composition contains a thickener, the cold storage material composition can be gelled in an environment of a temperature equal to or higher than the melting temperature of the cold storage material composition. The cold storage material composition containing the thickener can undergo a phase transition from a solidified (solid) state to a molten (gel-like) state.

Other than the above-described components, the present cold storage material composition can also contain, as necessary, a phase separation inhibitor (e.g., oleic acid, sodium oleate, potassium oleate, potassium metaphosphate, sodium silicate, or potassium isostearate), a perfume, a colorant, an antibacterial agent, a high molecular polymer, other organic compound, other inorganic compound, and/or the like.

As long as the present cold storage material composition has a melting temperature in a range of −75° C. to −55° C., the present cold storage material composition in a state of having a temperature equal to or higher than the melting temperature and in a liquefied state may contain other substance and/or other ions as well as calcium ions, chloride ions, bromide ions, and ammonium ions. Examples of the other substance include metals such as a light metal and a heavy metal. Examples of the light metal include aluminum, magnesium, beryllium, and titanium. Examples of the heavy metal include iron, lead, gold, platinum, silver, copper, chromium, cadmium, mercury, zinc, arsenic, manganese, cobalt, nickel, molybdenum, tungsten, tin, bismuth, uranium, and plutonium. Examples of the other ions include metal ions such as light metal ions of the above light metal and heavy metal ions of the above heavy metal.

The materials (compounds and water) used for production of the present cold storage material composition can include any of the above-described metals.

[2-2. Physical Properties of Cold Storage Material Composition]

A cold storage material composition according to one or more embodiments of the present disclosure has a melting temperature in a range of −75° C. to −55° C.

Figure 1B:
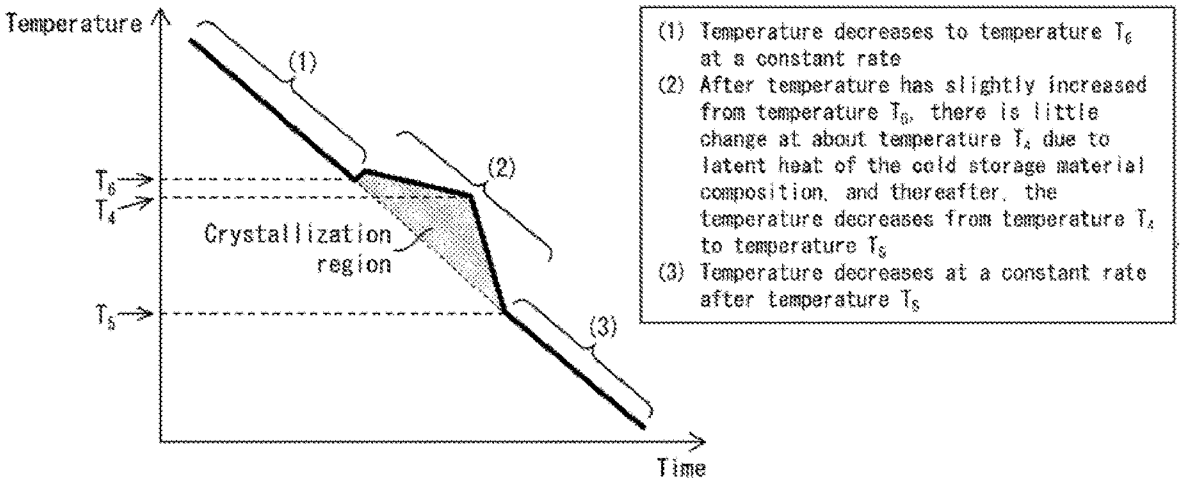
Figure 1C:
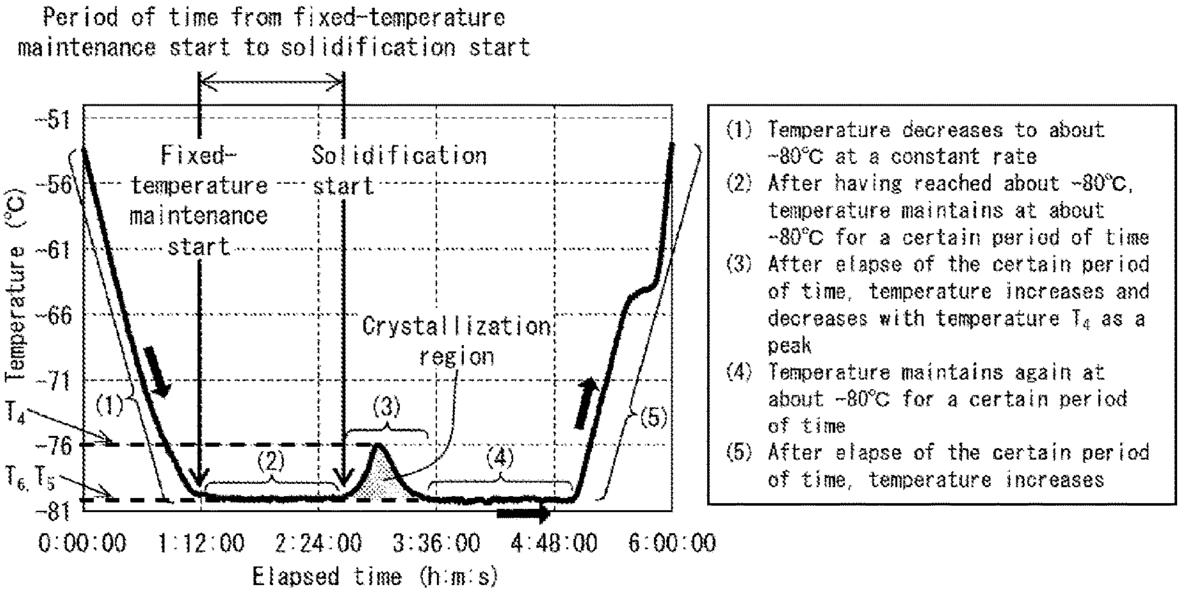

In the present specification, the "melting temperature" of a cold storage material composition is intended to mean "a temperature of the cold storage material composition during a period from when the cold storage material composition in a solid state starts melting to when the cold storage material composition turns into a liquefied state". Note that the word "liquefied" encompasses the above-described "gelled". The "melting temperature" will be more specifically discussed with reference to FIG. 1(*a*). FIG. 1(*a*) is a graph plotting a change over time in temperature of a cold storage material composition when the cold storage material composition in a solidified state according to one or more embodiments was placed in a thermostatic bath, and the temperature of the thermostatic bath was then increased from a cryogenic temperature at a constant rate of temperature increase. In comparison with the temperature of the thermostatic bath which is increased at a constant rate, the temperature of the cold storage material composition, as shown in FIG. 1(*a*), changes in the order of the following (1) to (3): (1) The temperature of the cold storage material composition increases at a constant rate; (2) after temperature $T_1$, there is little change due to latent heat of the cold storage material composition, and the temperature of the cold storage material composition stays constant from the temperature $T_1$ to temperature $T_2$; and (3) the temperature of the cold storage material composition starts increasing again after the temperature $T_2$. The temperature $T_1$ as used herein is referred to as "melting start temperature", and the temperature $T_2$ as used herein is referred to as "melting end temperature". A midpoint between the temperature $T_1$ and the temperature $T_2$, i.e., temperature $T_3$, is defined herein as "melting temperature".

Further, in regard to the cold storage material composition according to one or more embodiments, a state in which the temperature of the cold storage material composition is maintained, in a period of time from the melting start temperature $T_1$ to the melting end temperature $T_2$, in a range from the melting start temperature $T_1$ to a temperature 3.0° C. higher than the melting start temperature $T_1$ due to the action of latent heat of the cold storage material composition is defined as "fixed-temperature maintenance". In a case where the cold storage material composition exhibits the fixed-temperature maintenance, the cold storage material composition is regarded as having fixed-temperature maintainability. The cold storage material composition preferably has fixed-temperature maintainability.

A melting temperature of a cold storage material composition is not particularly limited as long as it is in a range of −75° C. to −55° C., and can be set as appropriate according to different control temperatures required for a variety of temperature control target articles. For example, storage or transportation of an article such as a pharmaceutical product, a medical device, a specimen, an organ, a chemical substance, or food may require the control temperature to be equal to or lower than −40° C. Further, storage or transportation of specific active biopharmaceutical ingredients, regenerative cells, vaccines, and the like may require the control temperature to be equal to or lower than −60° C. Thus, from the viewpoint of being usable for a wide variety of temperature control target articles, the present cold storage material composition has a melting temperature preferably in a range of −75° C. to −60° C. Like the cold storage material composition, a cold storage material according to one or more embodiments has a melting temperature in the above-described ranges.

In the present disclosure, the "solidification start temperature" of a cold storage material composition is intended to mean "a temperature of the cold storage material composition at which temperature the cold storage material composition in a liquid state starts solidifying into a solid state". The "solidification start temperature" will be more specifically discussed with reference to FIG. 1(*b*). FIG. 1(*b*) is a graph plotting a change over time in temperature of a cold storage material composition when the cold storage material composition in a melted state according to one or more embodiments was placed in a thermostatic bath, and the temperature of the thermostatic bath was then decreased from room temperature (e.g., 25° C.) at a constant rate of temperature decrease. In comparison with the temperature of the thermostatic bath which is decreased at a constant rate, the temperature of the cold storage material composition changes, as shown in FIG. 1(*b*), in the order of the following (1) to (3): (1) The temperature of the cold storage material composition decreases to temperature $T_6$ at a constant rate; (2) after the temperature of the cold storage material composition has slightly increased from the temperature $T_6$, there is little change at about temperature $T_4$ due to latent heat of the cold storage material composition, and thereafter, the temperature of the cold storage material composition decreases from the temperature $T_4$ to temperature $T_5$; and (3) the temperature of the cold storage material composition decreases at a constant rate after the temperature $T_5$. In the present specification, the temperature $T_6$ is referred to as "solidification start temperature", and the temperature $T_5$ is referred to as "solidification end temperature". That is, the "solidification start temperature" can also be referred to as "temperature of a cold storage material composition at which temperature solidification of the cold storage material composition in a liquid state starts". In (2) above, after the cold storage material composition shows the temperature $T_6$ (solidification start temperature), the temperature of the cold storage material composition slightly increases. This indicates that the heat storage material composition in the liquid state in a state of being supercooled at the temperature $T_6$. Further, in the present specification, it can also be said that the solidification (also referred to as crystallization) of a cold storage material composition starts from a point in time when the cold storage material composition shows the temperature $T_6$ and ends at a point in time when the cold storage material composition shows the temperature $T_5$. Therefore, in the present specification, the temperature $T_4$ can be translated as "crystallization peak". In the present specification, a region defined by a line connecting the temperature $T_6$ and the temperature $T_5$ and line segments of a graph having the temperature $T_4$, as a peak, between the temperature $T_6$ and the temperature $T_5$ is also referred to as "crystallization region". The crystallization region is a region indicated with a hatching (shading) in FIG. 1(*b*). Further, in some cases, the temperature of the cold storage material composition does not clearly show the temperature $T_4$ and the temperature $T_5$.

FIG. 1(*b*) shows a temperature change of the cold storage material composition in the course of solidification of the cold storage material composition during a temperature decrease of the thermostatic bath from room temperature to −80° C. For example, the cold storage material composition in Example 6 (described later) exhibits a temperature change as shown in FIG. 1(*b*) and solidifies during the temperature decrease of the thermostatic bath from room temperature to −80° C. However, a cold storage material composition having a solidification start temperature of about −80° C. (e.g., cold storage material composition in Example 9 (described later)) solidifies while the temperature of the thermostatic bath is maintained at −80° C. This will be more specifically described with reference to FIG. 1(*c*).

FIG. 1(*c*) is a graph plotting a change over time in temperature of a cold storage material composition when the cold storage material composition in a melted state according to one or more embodiments was placed in a thermostatic bath, the temperature of the thermostatic bath was then decreased from room temperature (e.g., 25° C.) to −80° C. at a constant rate of temperature decrease and was subsequently maintained at −80° C. for a certain period of time, and thereafter, the temperature of the thermostatic bath was increased from −80° C. at a constant rate of temperature increase. In comparison with the temperature of the thermostatic bath which is decreased at a constant rate, the temperature of the cold storage material composition changes, as shown in FIG. 1(*c*), in the order of the following (1) to (5): (1) The temperature of the cold storage material composition decreases to about −80° C. at a constant rate; (2) after having reached about −80° C., the temperature of the cold storage material composition maintains at about −80° C. for a certain period of time; (3) after an elapse of the certain period of time, the cold storage material composition exhibits a temperature increase and a temperature decrease with the temperature $T_4$ as a peak; (4) the temperature of the cold storage material composition maintains again at about −80° C. for a certain period of time; and (5) after an elapse of the certain period of time, the temperature of the cold storage material composition increases. In the present specification, a point in time when the period (2) starts in FIG. 1(*c*), i.e. when the cold storage material composition starts maintaining about −80° C. for the certain period of time, is referred to as "fixed-temperature maintenance start". Further, a point in time when the period (3) starts (the period (2) ends), i.e. when the temperature increase with the temperature $T_4$ as a peak starts, is referred to as "solidification start", and the temperature at such a point in time is referred to as "solidification start temperature" and is regarded as the temperature $T_6$. Further, a point in time when the period (4) starts, i.e. when, after the temperature decrease, the cold storage material composition starts maintaining about −80° C. for a certain period of time again, is referred to as "solidification end", and the temperature at such a point in time is referred to as "solidification end temperature" and is regarded as the temperature $T_5$. Further, the period (2), i.e. a period from the "fixed-temperature maintenance start" to the "solidification start", is defined as a "period of time from the fixed-temperature maintenance start to the solidification start". Further, in the period (3), the temperature increase and the temperature decrease with the temperature $T_4$ as a peak indicates that solidification (crystallization) occurs in the cold storage material composition. Therefore, in the present specification, the temperature $T_4$ can be translated as "crystallization peak". In the present specification, a region defined by a line connecting the temperature $T_6$ and the temperature $T_5$ and line segments of a graph having the temperature $T_4$, as a peak, between the temperature $T_6$ and the temperature $T_5$ is also referred to as "crystallization region". The crystallization region is a region indicated with a hatching (shading) in FIG. 1(*c*). Note that although the temperature $T_6$ and the temperature $T_5$ are the same temperatures in FIG. 1(*c*), the temperature $T_6$ and the temperature $T_5$ are not the same temperatures and can be much the same temperatures. Further, in the present specification, the temperatures $T_4$, $T_5$, and $T_6$ in FIG. 1(*b*) are intended to be the same as the temperatures $T_4$, $T_5$, and $T_6$ in FIG. 1(*c*).

In FIG. 1(*c*), a temperature change of the thermostatic bath is the same as the temperature change indicated as (1), and the temperature of the thermostatic bath is decreased until (1) ends. Further, the temperature of the thermostatic bath is maintained at −80° C. for the duration of a period from (2) to (4) above. Further, a temperature change of the thermostatic bath is the same as the temperature change indicated as (5), i.e. the temperature of the thermostatic bath is increased at the same time when (5) starts.

The melting temperature and solidification start temperature of the cold storage material composition can be measured by (i) placing a measurement test sample in a commercially available thermostatic bath equipped with a temperature control unit, (ii) increasing or decreasing a temperature of the thermostatic bath at a certain rate, and (iii) monitoring a temperature of the test sample with the use of a thermocouple during the increasing or decreasing of the temperature of the thermostatic bath.

In some embodiments, a cold storage material composition has a solidification start temperature of preferably not less than −80° C., more preferably not less than −79° C., even more preferably not less than −75° C., and particularly preferably not less than −70° C. The above configuration makes it possible to solidify the cold storage material composition with the use of a common freezer capable of cooling to −80° C. The above configuration also has the advantage of solidifying the cold storage material composition in a short time.

In some embodiments, a cold storage material composition has a difference between a melting temperature and a solidification start temperature is preferably not more than 16° C., more preferably not more than 15° C., even more preferably not more than 13° C., and particularly preferably not more than 6° C. The above configuration has the advantage of solidifying the cold storage material composition in a short time.

[2-3. Method of Producing Cold Storage Material Composition]

A method of preparing a cold storage material composition according to one or more embodiments of the present disclosure is not limited to any particular method and can be any publicly-known method. For example, the cold storage material composition can be prepared by (i) mixing a calcium salt, a chloride salt, a bromide salt, and an ammonium salt in advance by use of a tumbler mixer, a ribbon blender, or the like, (ii) putting a resultant mixture in a container, (iii) pouring water into the container, and (iv) stirring the mixture by use of a mixer or the like while cooling the container. Alternatively, the cold storage material composition can be prepared by (i) preparing respective aqueous solutions of a calcium salt, a chloride salt, a bromide salt, and an ammonium salt and (ii) mixing the aqueous solutions.

[3. Method of Producing Cold Storage Material Composition]

In one or more embodiments, a method of producing a cold storage material composition includes a mixing step of forming a mixture in which water, calcium chloride, calcium bromide, and ammonium chloride are mixed. In the present specification, this production method is also referred to as production method 1. Further, the production method 1 of a cold storage material composition according to one or more embodiments is also referred to as present production method 1. With the above-described configuration, the present production method 1 can produce a cold storage material composition having the advantages described in Advantages (1) to (4) above.

In one or more embodiments, a method of producing a cold storage material composition includes a mixing step of forming a mixture in which water, calcium chloride, and ammonium bromide are mixed. In the present specification, this production method is also referred to as production method 2. Further, the production method 2 of a cold storage material composition according to one or more embodiments is also referred to as present production method 2. With the above-described configuration, the present production method 2 can produce a cold storage material composition having the advantages described in Advantages (1) to (4) above.

In one or more embodiments, the present production method 2 further includes a cooling step of cooling the mixture to deposit ammonium chloride and then removing the deposited ammonium chloride. In the present specification, the production method 2 including the cooling step is also referred to as production method 2'. Further, the production method 2' of a cold storage material composition according to one or more embodiments is also referred to as present production method 2'. With the above-described configuration, the production method 2' allows a resulting cold storage material composition to have the advantages described in Advantages (1) to (4) above and have the advantage of showing a melting temperature of −75° C. to −55° C. with higher repeatability and higher stability.

The production method 2' allows for removal of ammonium chloride by cooling. This is considered to be ascribable to the cause below (however, the present disclosure is not particularly limited to the cause (principle) below). In the mixture prepared in the mixing step in the production method 2' (such a mixing step is the same as the mixing step in the production method 2), it is presumed that, in a case where the mixture is in a liquid state, calcium chloride and ammonium bromide are dissociated independently, so that calcium ions, chloride ions, bromide ions, and ammonium ions are present in the mixture. Here, salts that can be prepared by the combination of these ions are calcium chloride, calcium bromide, ammonium chloride, and ammonium bromide. Ammonium chloride has the lowest saturated solubility in comparison with calcium chloride, calcium bromide, and ammonium bromide. As such, it is presumed that cooling enables deposition of ammonium chloride and removal of the deposited ammonium chloride. In the cooling step of the production method 2', not only ammonium chloride but also other substance (e.g., calcium chloride, calcium bromide, or ammonium bromide) may be removed, but it is preferable that ammonium chloride only is removed.

In the mixing steps of the present production methods 1, 2, and 2', a method for forming a mixture is not limited to any specific method and can be a method known in the art. Further, in the cooling step of the present production method 2', a method for cooling the mixture is not limited to any specific method and can be a method known in the art. In the cooling step of the present production method 2', it is preferable that aqueous solutions are stirred to cool the mixture evenly and to efficiently deposit ammonium chloride. Further, in the cooling step of the present production method 2', a method for removing the deposited ammonium chloride is not limited to any specific method and can be a method known in the art. For example, the cooled cold storage material composition may be subjected to filtration, centrifugation, or other method so that the deposited ammonium chloride can be removed. Alternatively, the deposited ammonium chloride can be removed by allowing the cooled cold storage material composition to stand still so that the deposited ammonium chloride is precipitated and a supernatant liquid is obtained. In this case, the supernatant liquid may be a final cold storage material composition.

In the present production method 1, any substance, in addition to water, calcium chloride, calcium bromide, and ammonium chloride, may be mixed as long as the effect according to one or more embodiments is not impaired. Further, in the present production methods 2 and 2', any substance, in addition to water, calcium chloride, and ammonium bromide, may be mixed as long as the effect in one or more embodiments is not impaired. Examples of the any substance include a calcium salt, a chloride salt, a bromide salt, an ammonium salt, a crystal nucleating agent, a thickener, a phase separation inhibitor, a perfume, a colorant, an antibacterial agent, a high molecular polymer, other organic compound, other inorganic compound, and/or the like, which are all listed in the [2. Cold storage material composition] section above.

The cold storage material compositions produced by the present production methods 1, 2, and 2' preferably contain 0.1 mol to 20.0 mol of calcium ions, 0.1 mol to 28.0 mol of chloride ions, 0.1 mol to 20.0 mol of bromide ions, and 0.01 mol to 10.00 mol of ammonium ions, relative to 100 mol of water.

In the present production method 1, all of the components derived from calcium chloride, calcium bromide, and ammonium chloride, which are used (blended) in the mixing step, are contained in the cold storage material composition and can be dissociated at room temperature. Thus, the amounts of calcium ions, chloride ions, bromide ions, and ammonium ions that can be contained in the resulting cold storage material composition can be determined through theoretical calculation from the blended amounts of calcium chloride, calcium bromide, and ammonium chloride.

In the present production method 2, all of the components derived from calcium chloride and ammonium bromide, which are used (blended) in the mixing step, are contained in the cold storage material composition and can be dissociated at room temperature. Thus, the amounts of calcium ions, chloride ions, bromide ions, and ammonium ions that can be contained in the resulting cold storage material composition can be determined through theoretical calculation from the blended amounts of calcium chloride and ammonium bromide.

In the cooling step of the present production method 2', at least part of ammonium chloride in the cold storage material composition is removed. In other words, in the cooling step of the present production method 2', at least part of chloride ions and at least part of ammonium ions in the cold storage material composition are removed. Thus, in the present production method 2', it is preferable that the blended amounts of calcium chloride, calcium bromide, and ammonium chloride relative to water are adjusted as appropriate such that a finally obtained cold storage material composition contains 0.1 mol to 20.0 mol of calcium ions, 0.1 mol to 28.0 mol of chloride ions, 0.1 mol to 20.0 mol of bromide ions, and 0.01 mol to 10.00 mol of ammonium ions, relative to 100 mol of water.

The types and amounts of ions contained in the cold storage material composition produced in the present production method 2' can be measured by ion chromatography. The measurement can be carried out by any publicly-known method.

Each of the cold storage material compositions produced in the present production methods 1, 2, and 2' are preferably the cold storage material composition described in the [2. Cold storage material composition] section above. Thus, the blended amounts of calcium chloride, calcium bromide, and ammonium chloride used in the present production method 1 and the blended amounts of calcium chloride and ammonium bromide used in the present production methods 2 and 2' preferably satisfy preferable embodiments of the chloride salt and the bromide salt, described in the [2. Cold storage material composition] section, both of which are to be added in the cold storage material composition. Further, as the physical properties of the cold storage material compositions produced in the present production methods 1, 2, and 2', the description in the [2-2. Physical properties of cold storage material composition] section above can be incorporated as appropriate.

The cooling step is preferably carried out at a temperature which is not less than −40° C. and is lower than the temperature at which the mixing step is carried out.

In the present production method 2', the cooling step is preferably carried out at a temperature which is not less than −40° C. and is lower than the temperature at which the mixing step is carried out. With the above configuration, a resulting cold storage material composition has the advantage of showing the melting temperature of −75° C. to −55° C. with higher stability for a longer period of time. Note that the mixing steps of the present production methods 1, 2, and 2' are carried out at, for example, 40° C., 50° C., or 60° C.

Further, a method of producing a cold storage material composition according to one or more embodiments can be configured as below.

[A] A method of producing a cold storage material composition, including a mixing step of forming a mixture in which water, ammonium chloride, and calcium bromide are mixed.

[B] A method of producing a cold storage material composition, including a mixing step of forming a mixture in which water, calcium chloride, a bromide salt, and an ammonium salt are mixed.

[C] A method of producing a cold storage material composition, including a mixing step of forming a mixture in which water, calcium bromide, a chloride salt, and an ammonium salt are mixed.

[D] A method of producing a cold storage material composition, including a mixing step of forming a mixture in which water, ammonium chloride, a calcium salt, and a bromide salt are mixed.

[E] A method of producing a cold storage material composition, including a mixing step of forming a mixture in which water, a calcium salt, a chloride salt, a bromide salt, and an ammonium salt are mixed.

[F] The method as set forth in any one of [A] to [E], further including a cooling step of, after the mixing step, cooling the mixture to deposit ammonium chloride and remove the deposited ammonium chloride.

[G] The method as set forth in [F], in which the cooling step is carried out at a temperature which is not less than −40° C. and is lower than the temperature at which the mixing step is carried out.

Next, the following description will discuss the "cold storage material".

[4. Cold Storage Material]

A cold storage material according to one or more embodiments need only include the above-described cold storage material composition. Other components, materials, and the like of the cold storage material are not limited.

The cold storage material according to one or more embodiments is usable as a cold storage material of a latent heat type since a cold storage material composition which forms the cold storage material absorbs thermal energy in undergoing a phase transition from a solidified (solid) state to a molten (liquid) state (in other words, in melting). The cold storage material according to one or more embodiments can also be regarded as a melt-type latent heat cold storage material. Note that the molten state encompasses the above-described "gel-like form".

The cold storage material according to one or more embodiments can be obtained by, for example, charging the above-described cold storage material composition in a container, a bag, or the like.

The container or the bag is preferably made mainly of resin (e.g., synthetic resin) in order to prevent the cold storage material composition from leaking out due to rusting and corrosion caused by the cold storage material composition. Examples of the resin include polyvinyl chloride, polyethylene, polypropylene, polyethylene terephthalate, polystyrene, nylon, and polyester.

One of these materials can be used alone. Alternatively, two or more of the materials can be used in combination (e.g., by taking on a multilayer structure) in order to improve thermal resistance and barrier performance. From the viewpoint of handling and cost, the container or the bag is preferably made of polyethylene.

A shape of the container or the bag is not limited to any particular one. However, from the viewpoint of efficiently exchanging heat between the cold storage material composition and a temperature control target article or a space around the temperature control target article via the container or the bag, the container or the bag preferably has a shape that provides a small thickness and can secure a large surface area. A cold storage material can be produced by filling such a container or a bag with the cold storage material composition.

Note that more specific examples of the container or the bag include a container and a bag disclosed in Japanese Patent Application Publication Tokukai No. 2015-78307, which is incorporated herein by reference.

A melting temperature of a cold storage material according to one or more embodiments can be regarded as being identical to a melting temperature of a cold storage material composition which the cold storage material includes.

Next, the following description will discuss the "transport container".

[5. Transport Container]

A transport container according to one or more embodiments need only include the above-described cold storage material according to one or more embodiments. Other specific configurations, materials, and the like of the transport container are not particularly limited.

Figure 2A:
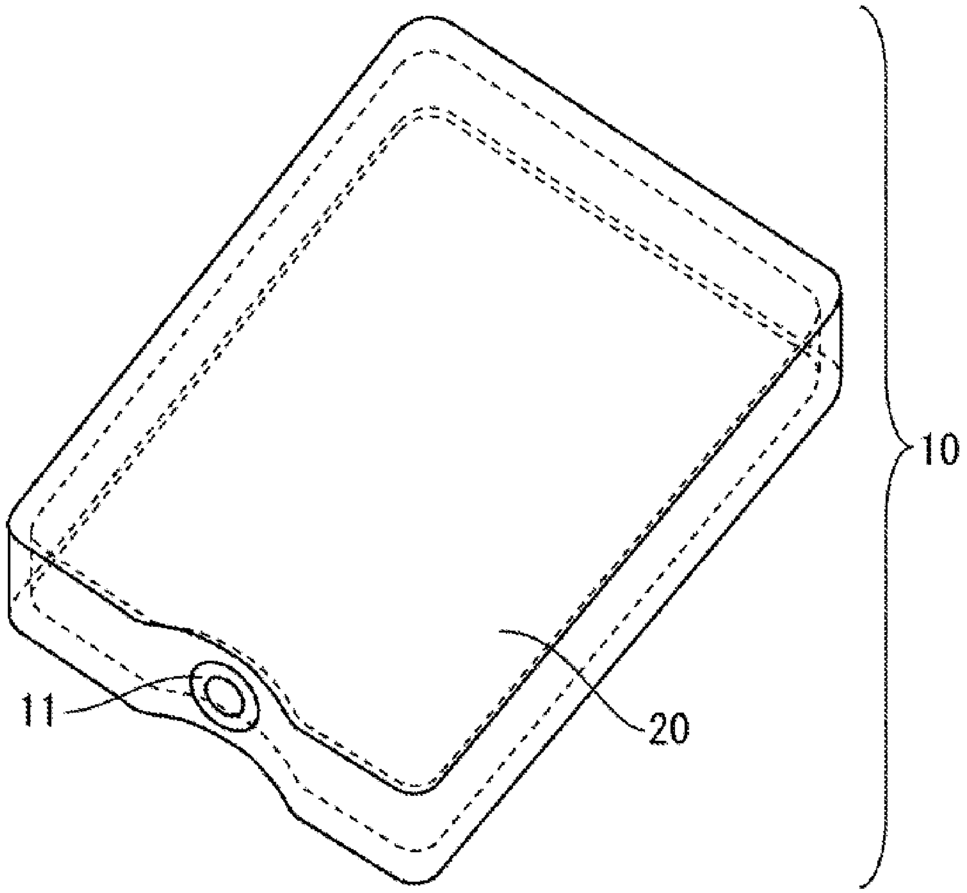
FIG. 2(*a*) is a perspective view schematically illustrating an example of a cold storage material according to one or more embodiments of the present disclosure.
Figure 2B:
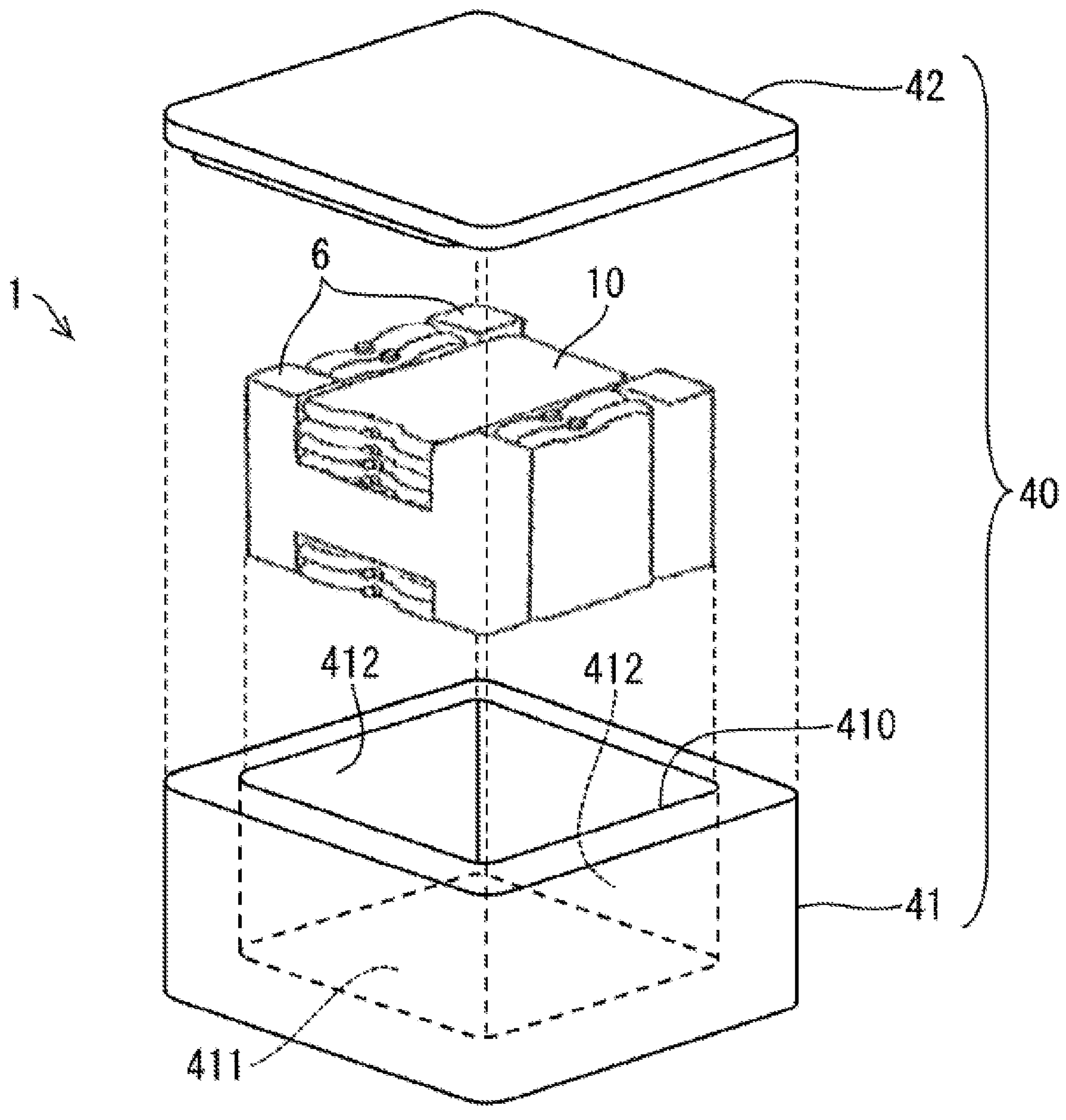

FIG. 2 illustrates an example of the transport container according to one or more embodiment. FIG. 2(*a*) is a perspective view schematically illustrating a cold storage material 10 according to one or more embodiments. FIG. 2(*b*) is an exploded perspective view schematically illustrating a transport container 1 according to one or more embodiment.

As illustrated in FIGS. 2(*a*) and 2(*b*), the opening of the cold storage material 10 in accordance with the present embodiment is blocked by a cap 11 of the cold storage material. A cold storage material composition 20 according to one or more embodiment is charged into the cold storage material 10 through the opening. The cold storage material 10 can be used while being housed or placed in a thermal insulation container 40.

A material of the cold storage material 10 and a material of the cap 11 for the cold storage material are not limited to any specific materials, and can be any materials known in the art.

The thermal insulation container 40 includes, for example, a box 41 and a lid 42 which fits an opening 410 of the box, so as to have a thermal insulation property.

A material of the thermal insulation container 40 is not limited to any specific material, provided that the material of the thermal insulation container 40 has a thermal insulation property. From the viewpoint of employing a lightweight and inexpensive material which can prevent dew condensation, it is suitable to employ a foamed plastic as the material of the thermal insulation container 40. From the viewpoint of employing a material which has an excellent thermal insulation property, which maintains a temperature for a long period of time and which can prevent dew condensation, it is suitable to use a vacuum thermal insulation material as the material of the thermal insulation container 40. Examples of the foamed plastic include foamed polyurethane, foamed polystyrene, foamed polyethylene, foamed polypropylene, foamed AS resin, and foamed ABS resin. Examples of the vacuum thermal insulation material include vacuum thermal insulation materials whose cores are made of silica powder, glass wool, glass fiber, or the like. The thermal insulation container 40 can be constituted by a combination of the foamed plastic and the vacuum thermal insulation material. In such a case, a thermal insulation container 40 having a high thermal insulation performance can be produced by, for example, (i) covering, with the vacuum thermal insulation material, an outer surface or an inner surface of each of the box 41 and the lid 42 that are made of foamed plastic, or (ii) embedding the vacuum thermal insulation material in walls constituting each of the box 41 and the lid 42 that are made of foamed plastic.

Figure 3A:
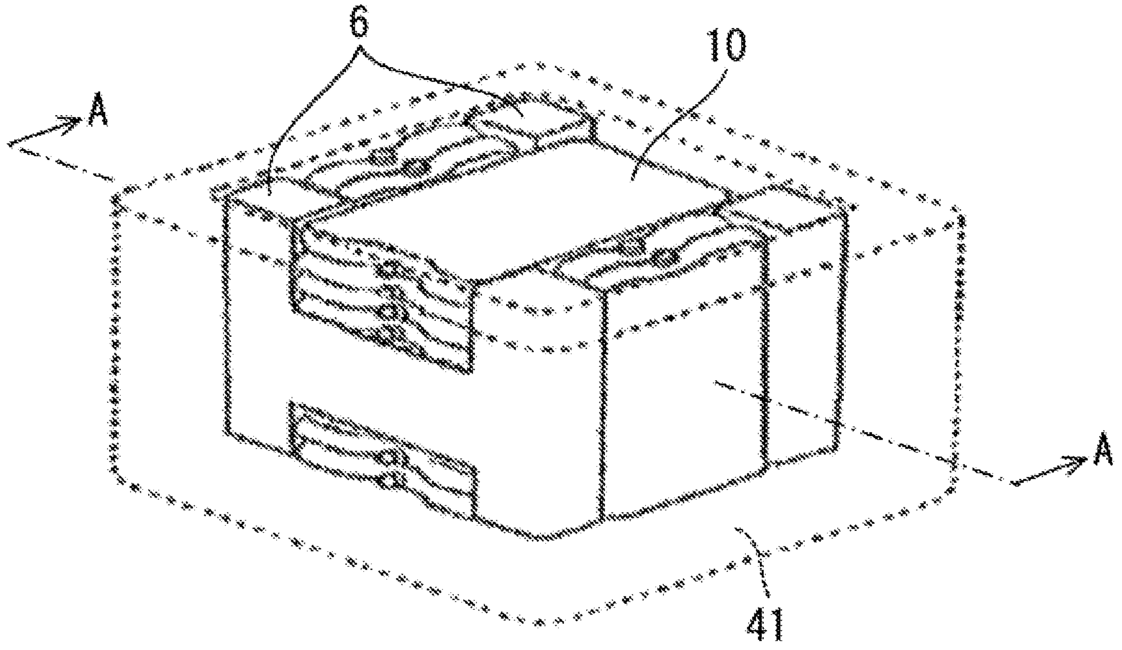
FIG. 3(*a*) is a perspective view schematically illustrating an inside of the transport container according to one or more embodiments of the present disclosure.
Figure 3B:
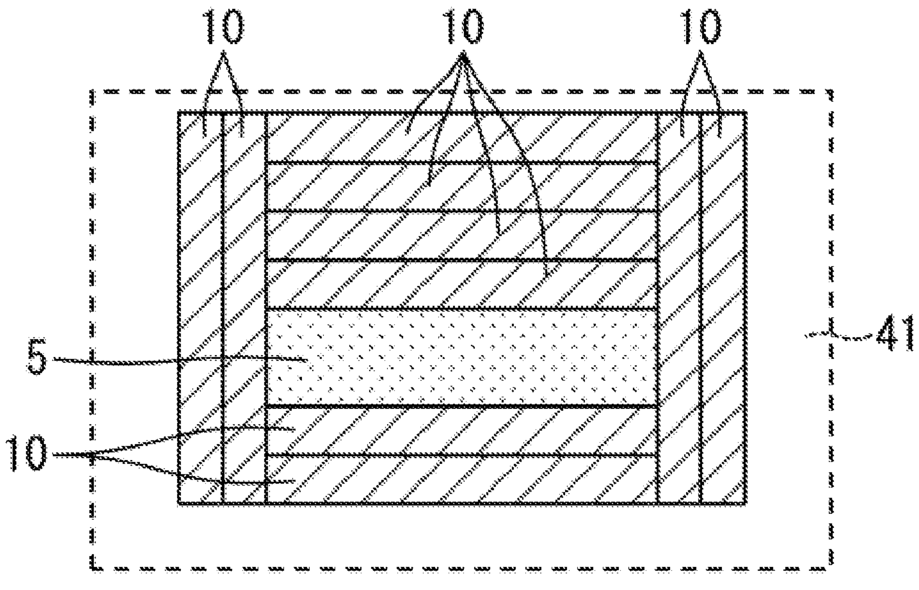

FIG. 3(*a*) is a perspective view schematically illustrating an inside of the transport container 1. FIG. 3(*b*) is a cross-sectional view schematically illustrating a plane taken along the line A-A in FIG. 3(*a*).

As illustrated in FIG. 2(*b*), (*i*) the thermal insulation container 40 includes the box 41 and the lid 42, and (ii) the transport container 1 according to one or more embodiments includes the thermal insulation container 40, the cold storage materials 10, and spacers 6. As illustrated in FIGS. 2 and 3, the transport container 1 according to one or more embodiments can include the spacers 6 which, when the cold storage materials 10 are housed or placed in the transport container 1, are intended to (1) fill a space between (a) a surface of the lid 42 which covers a space in the box, lateral surfaces 412 of the box, and a bottom surface 411 of the box and (b) the cold storage materials 10 and (2) secure a space 5 for accommodating a temperature control target article as illustrated in FIG. 3(*b*).

Although the transport container 1 includes 10 cold storage materials 10 in FIGS. 2 and 3, the number of cold storage materials included in the transport container 1 is not particularly limited, provided that at least one cold storage material is included in the transport container 1. The transport container 1 includes preferably two or more cold storage materials 10, more preferably four or more cold storage materials 10, even more preferably six or more cold storage materials 10, and particularly preferably ten or more cold storage materials 10, from the viewpoint of storing or transporting a temperature control target article at a control temperature for a long period of time and/or at a control temperature with stability. The number of cold storage materials 10 included in the transport container 1 may be selected as appropriate according to, for example, the size of a cold storage material 10, a period of time for which a temperature control target article is to be stored or transported, and an ambient temperature during storage or transportation of the temperature control target article.

A material of the spacers 6 is not limited to any specific material. Examples of the material include polyurethane, polystyrene, polyethylene, polypropylene, AS resin, ABS resin, and a foamed plastic obtained by foaming such a resin.

According to one or more embodiments, a pair of spacers 6 is placed in the thermal insulation container 40 such that the spacers 6 face each other. In a case where the transport container 1 according to one or more embodiments includes the spacers 6, where to place the cold storage materials 10 is fixed. This makes packing easier. The size and number of spacers 6 included in the transport container 1 are not particularly limited, and can be set as appropriate according to, for example, the sizes of the transport container 1, the cold storage material 10, and a temperature control target article.

In FIGS. 2 and 3, one space 5 for accommodating the temperature control target article is included in the transport container 1. However, any number of spaces 5 can be included in the transport container 1, provided that at least one space 5 is included in the transport container 1. Alternatively, a plurality of spaces 5 can be included in the transport container 1. For example, separate spaces 5 may be available by placing the cold storage material(s) 10 and/or the spacer(s) 6 in one space 5.

With the transport container according to one or more embodiments, it is possible to store or transport an article that requires temperature control (i.e., temperature control target article), while the article is maintained at a temperature in a range of −75° C. to −55° C. for a long period of time regardless of an ambient temperature. The transport container in accordance with the present embodiment can be suitably used to store or transport various kinds of articles such as cells, pharmaceutical products, medical devices, specimens, organs, chemical substances, food, and the like that require temperature control. As described above, the transport container according to one or more embodiments, which can maintain a temperature control target article at a temperature in a range of −75° C. to −55° C. for a long period of time, can also be regarded as "temperature keeping container".

Further, storage or transportation of some of the temperature control target articles, i.e. regenerative cells, vaccines, antibodies, and gene therapy vectors, may require the control temperature to be equal to or lower than −60° C. Thus, for these applications, a transport container capable of storing or transporting the articles while maintaining the articles at not more than −60° C. (for example, a transport container capable of storing or transporting the articles while maintaining the articles at not less than −75° C. and not more than −60° C.) according to one or more embodiments can be suitably used. Note that examples of the applications for which the transport container storing or transporting the articles while maintaining the articles at not more than −60° C. is used include transport of cells (e.g., transport of frozen cells inside a cell culture center, transport of frozen cells from one facility to another facility (for example, from a cell bank to a cell culture center), and the like) and storage of cells (e.g., temporary storage of frozen cells in a sterile room or a clean bench, storage (back-up) application at a power failure of a deep freezer used in the cell bank or the cell culture center, and the like).

Note that more specifically, the thermal insulation container described above can be configured as disclosed in Japanese Patent Application Publication Tokukai No. 2015-78307, which is incorporated herein by reference.

The following description will discuss "a method of using a cold storage material composition".

[6. Method of Using Cold Storage Material Composition]

One or more embodiments are directed to a method of using a cold storage material composition, including: a solidifying step of keeping a cold storage material composition at a temperature lower than a melting temperature of the cold storage material composition to solidify the cold storage material composition, the cold storage material composition including water, calcium ions, chloride ions, bromide ions, and ammonium ions; and a maintaining step of maintaining part or whole of a target object at not less than −75° C. to not more than −55° C. under an environment with a temperature which exceeds the melting temperature of the cold storage material composition, the cold storage material composition including 0.1 mol to 20.0 mol of the calcium ions, 0.1 mol to 28.0 mol of the chloride ions, 0.1 mol to 20.0 mol of the bromide ions, and 0.01 mol to 10.00 mol of the ammonium ions, relative to 100 mol of the water.

Here, in the present disclosure, the "target object" is intended to mean a temperature control target article and/or a surrounding environment (including a vapor phase, a liquid phase, and a solid phase) of the temperature control target article.

The solidifying step may include a step of keeping a cold storage material composition at a temperature lower than a solidification start temperature of the cold storage material composition to solidify the cold storage material composition.

The cold storage material composition in the method of using the cold storage material composition according to one or more embodiments is the cold storage material composition according to one or more embodiments described herein. In the description of the cold storage material composition, the description in the [2. Cold storage material composition] section can be incorporated as appropriate.

Further, the cold storage material composition in the method of using the cold storage material composition according to one or more embodiments is a cold storage material composition produced by a method of producing a cold storage material composition according to one or more embodiments described herein. In the description of the method of producing the cold storage material composition, the description in the [3. Method of producing cold storage material composition] section can be incorporated as appropriate.

Specifically, the using method according to one or more embodiments can be provided in any of the following aspects (1) to (5):

(1) A method of using a cold storage material composition as follows: That is, the cold storage material described in the [4. Cold storage material] section is prepared by charging a cold storage material composition into a container or the like. Thereafter, the cold storage material is kept at a temperature lower than a melting temperature of the cold storage material composition to solidify the cold storage material (solidifying step). The solidified cold storage material is placed in the transport container described in the [5. Transport container] section, and the target object is stored and/or transported while the target object is maintained at −75° C. to −55° C. under an environment with a temperature which exceeds a melting temperature of the cold storage material composition (maintaining step).

(2) A method of using a cold storage material composition as follows: That is, the cold storage material described in the [4. Cold storage material] section, which has been prepared by charging a cold storage material composition, is put in advance in a freezer, a cryogenic freezer, or the like which is operated at a temperature lower than a melting temperature of the cold storage material composition (solidifying step). In this way, during a power failure, a target object in the freezer or the cryogenic freezer is stored while the target object is maintained at −75° C. to −55° C. (maintaining step).

(3) A method of using a cold storage material composition as follows: That is, in preparing the cold storage material described in the [4. Cold storage material] section by charging a cold storage material composition into a container or the like, the cold storage material composition in a liquid state and a target object are put in the container so that the target object is embedded in the cold storage material composition. Thereafter, the cold storage material is solidified by keeping the cold storage material at a temperature lower than a melting temperature of the cold storage material composition (solidifying step), so that the target object is stored and/or transported while the target object is maintained at −75° C. to −55° C. under an environment with a temperature which exceeds the melting temperature of the cold storage material composition (maintaining step).

(4) A method of using a cold storage material composition as follows: That is, the cold storage material described in the [4. Cold storage material] section is prepared by charging a cold storage material composition into a container or the like. Thereafter, the cold storage material is kept at a temperature lower than a melting temperature of the cold storage material composition to solidify the cold storage material (solidifying step). The solidified cold storage material is brought into contact with a target object which is present under an environment with a temperature which exceeds a melting temperature of the cold storage material composition, and a contacting part (one part) of the target object is maintained at −75° C. to −55° C. (maintaining step).

(5) A method of using a cold storage material composition as follows: That is, after a cold storage material composition in a liquid state is embedded in a target object, the cold storage material composition is kept at a temperature lower than a melting temperature of the cold storage material composition to solidify the cold storage material composition (solidifying step). In this way, the target object is stored and/or transported while the target object is maintained at −75° C. to −55° C. under an environment with a temperature which exceeds a melting temperature of the cold storage material composition (maintaining step).

In the using methods in (1) to (5) above, a specific method for keeping a cold storage material composition or the cold storage material described in the [4. Cold storage material] section at a temperature lower than a melting temperature of the cold storage material composition to solidify the cold storage material composition or the cold storage material is exemplified by the following method: That is, a method of putting the cold storage material composition or the cold storage material in a commercially available freezer whose temperature can be adjusted to a temperature lower than the melting temperature of the cold storage material composition, preferably a cryogenic freezer whose temperature can be adjusted to a temperature equal to or lower than −80° C., to solidify the cold storage material composition or the cold storage material. In the using methods in (1) to (5) above, a cold storage material composition or the cold storage material described in the [4. Cold storage material] section may be kept at a temperature lower than a solidification start temperature of the cold storage material composition so that the cold storage material composition or the cold storage material is solidified.

In the above-described method of using a cold storage material composition according to one or more embodiments, in the solidifying step, the cold storage material composition may be kept at a temperature equal to or lower than −80° C. to solidify the cold storage material composition, so that the cold storage material composition can be sufficiently solidified in a short period of time.

Although some specific examples of the method of using a cold storage material composition have been given above, the method of using a cold storage material composition according to one or more embodiments is not limited to those examples of the using method. The method of using a cold storage material composition provided by one or more embodiments of encompasses any method including: (i) a solidifying step of keeping a cold storage material composition according to one or more embodiments or a cold storage material composition produced by a method of producing a cold storage material composition according to one or more embodiments, at a temperature lower than a melting temperature of the cold storage material composition to solidify the cold storage material composition; and (ii) a maintaining step of maintaining part or whole of a target object at −75° C. to −55° C. by use of latent heat of melting of the solidified cold storage material composition under an environment with a temperature which exceeds the melting temperature of the cold storage material composition.

The configurations described in the above items can also be applied in other item(s) as appropriate.

Some embodiments can include the following configurations:

[1] A cold storage material composition including water, calcium chloride, and calcium bromide and having a melting temperature in a range of not less than −75° C. to not more than −55° C.

[2] The cold storage material composition as set forth in [1], including a crystal nucleating agent.

[3] The cold storage material composition as set forth in [2], in which the crystal nucleating agent is ammonium chloride.

[4] A cold storage material including a cold storage material composition described in any one of [1] to [3].

[5] A temperature keeping container including a cold storage material described in [4].

[6] A use method in which a composition including water, calcium chloride, and calcium bromide is kept at a temperature lower than a melting temperature of the composition to solidify the composition, and part or whole of a target object is maintained at not less than −75° C. to not more than −55° C. by latent heat of melting of the solidified composition under an environment with a temperature which exceeds the melting temperature.

[7] The method as set forth in [6], in which the temperature lower than the melting temperature is a temperature equal to or lower than −80° C.

[8] The method as set forth in [6] or [7], in which the composition includes a crystal nucleating agent.

Some embodiments can be configured as below.

[1] A cold storage material composition including 0.1 mol to 20.0 mol of calcium ions, 0.1 mol to 28.0 mol of chloride ions, 0.1 mol to 20.0 mol of bromide ions, and 0.01 mol to 10.00 mol of ammonium ions, relative to 100 mol of water, the cold storage material composition having a melting temperature in a range of −75° C. to −55° C.

[2] The cold storage material composition as set forth in [1], in which the cold storage material composition has a solidification start temperature of not less than −80° C.

[3] The cold storage material composition as set forth in [2], in which a difference between the melting temperature and the solidification start temperature is not more than 16° C.

[4] The cold storage material composition as set forth in [2], in which a difference between the melting temperature and the solidification start temperature is not more than 6° C.

[5] A cold storage material including a cold storage material composition described in any one of [1] to [4].

[6] A transport container including a cold storage material described in [5].

[7] A method of producing a cold storage material composition, including a mixing step of forming a mixture in which water, calcium chloride, calcium bromide, and ammonium chloride are mixed.

[8] A method of producing a cold storage material composition, including a mixing step of forming a mixture in which water, calcium chloride, and ammonium bromide are mixed.

[9] A method of producing a cold storage material composition, including a mixing step of forming any one of the following mixtures (A) through (E):

(A) a mixture in which water, ammonium chloride, and calcium bromide are mixed;

(B) a mixture in which water, calcium chloride, a bromide salt, and an ammonium salt are mixed;

(C) a mixture in which water, calcium bromide, a chloride salt, and an ammonium salt are mixed;

(D) a mixture in which water, ammonium chloride, a calcium salt, and a bromide salt are mixed; and (E) water, a calcium salt, a chloride salt, a bromide salt, and an ammonium salt.

[10] The method as set forth in [8] or [9], further including a cooling step of, after the mixing step, cooling the mixture to deposit ammonium chloride and remove the deposited ammonium chloride.

[11] The method as set forth in [10], in which the cooling step is carried out at a temperature which is not less than −40° C. and is lower than the temperature at which the mixing step is carried out.

[12] A method of using a cold storage material composition, including: a solidifying step of keeping a cold storage material composition at a temperature lower than a melting temperature of the cold storage material composition to solidify the cold storage material composition, the cold storage material composition including water, calcium ions, chloride ions, bromide ions, and ammonium ions; and a maintaining step of maintaining part or whole of a target object at not less than −75° C. to not more than −55° C. under an environment with a temperature which exceeds the melting temperature of the cold storage material composition, the cold storage material composition including 0.1 mol to 20.0 mol of the calcium ions, 0.1 mol to 28.0 mol of the chloride ions, 0.1 mol to 20.0 mol of the bromide ions, and 0.01 mol to 10.00 mol of the ammonium ions, relative to 100 mol of the water.

EXAMPLES

The following description will more specifically discuss some embodiments in reference to Examples. However, the present disclosure is not limited to such Examples.

The following materials were used in Examples and Comparative Examples.

<Compounds>

Calcium chloride [Calcium chloride for water content measurement, Molecular weight=110.98, available from Wako Pure Chemical Industries, Ltd.]

Calcium bromide [Calcium bromide hydrate, 98%, available from Strem Chemicals, Incorporated]

Ammonium chloride [Ammonium chloride, Molecular weight=53.49, available from Yamamoto Seisakusho, Inc.]

Ammonium bromide [Ammonium bromide, Molecular weight=97.94, available from Manac Incorporated]

Sodium chloride [Sodium chloride, Molecular weight=58.44, available from Wako Pure Chemical Industries, Ltd.]

Hydroxyethyl cellulose [HEC SE900, available from Daicel FineChem Ltd.]

<Water>

Drinking Tap Water

<Preparation of Cold Storage Material Composition>

Each of the cold storage material compositions in Examples 1 to 7 and Example 11 and in Comparative Examples 1 to 9 was prepared by (i) preparing respective aqueous solutions of the compounds shown in "Blended amount" sections of Tables 1 and 2 and (ii) mixing the aqueous solutions. The temperatures of the aqueous solutions at the mixing were 50° C.

All of the components derived from the compounds blended for each of the cold storage material compositions in Examples 1 to 7 and in Comparative Examples 1 to 9 are contained in the cold storage material compositions and can be dissociated at room temperature. Thus, the amounts of calcium ions, chloride ions, bromide ions, and ammonium ions that can be contained in each of the cold storage material compositions in Examples 1 to 7 and in Comparative Examples 1 to 9 can be determined through theoretical calculation from the types and amounts of the blended compounds.

Each of the cold storage material compositions in Examples 8 to 10 was prepared by carrying out the following steps (1) and (2): (1) A mixing step of (i) preparing respective aqueous solutions of the compounds shown in "Blended amount" sections of Tables 1 and 2 and (ii) mixing the aqueous solutions to produce a mixture was carried out. A temperature in the mixing step, in other words, a temperature of the aqueous solution at the mixing, was 50° C. (2) A cooling step of cooling the mixture obtained in (1) above to deposit ammonium chloride and remove the deposited ammonium chloride was carried out. A temperature in the cooling step was a temperature shown in Table 1. In other words, the mixture was cooled to the temperature shown in Table 1 so that ammonium chloride was deposited. Further, the cooled mixture was filtered to remove the deposited ammonium chloride. A filtrate (aqueous solution) obtained by the filtration was regarded as a cold storage material composition. Note that, in the cooling step, at least ammonium chloride was deposited, and at least the deposited ammonium chloride was removed, but it was not checked that ammonium chloride only had been deposited and deposited ammonium chloride only had been removed. That is, a compound other than ammonium chloride might be deposited, and the deposited compound other than ammonium chloride might be removed.

Measurements and evaluations in Examples and Comparative Examples were carried out under the following conditions and procedures.

<Ion Chromatography>

The types and amounts of ions contained in the cold storage material composition in Example 10 was measured by ion chromatography. Specifically, the measurement was carried out as below. A sample solution was obtained by weighing 0.1 mL (approximately 130 mg) of sample and then adjusting the weighed sample to 100 mL by addition of ultrapure water. The sample solution was filtered through a filter made of nylon and having a pore diameter of 0.45 μm, and anions and cations were quantified independently by ion chromatography. Note that the quantification of anions was carried out with the use of Integrion RFIC, which is a device available from Thermo Fisher Scientific Inc., while the quantification of cations was carried out with the use of Integrion, which is a device available from Thermo Fisher Scientific Inc.

<Melting Temperature>

A cold storage material composition charged in a cryovial made of polypropylene was allowed to stand still in an ultracold thermostatic bath [Ultracold aluminum block thermostatic bath CRYO PORTER (registered trademark) CS-80CP, available from Scinics Corporation], the temperature of the thermostatic bath was decreased at a rate of temperature increase/decrease of 0.5° C./min in a temperature range of −80° C. to 20° C., the cold storage material composition was solidified at −80° C., and the temperature of the thermostatic bath was then increased in the temperature range of −80° C. to 20° C. This operation is referred to as temperature increase/decrease test.

A change over time in temperature of the cold storage material composition in the thermostatic bath as measured in the course of the temperature rise of the thermostatic bath in the temperature increase/decrease test was plotted into FIG. 1(*a*). In comparison with the temperature of the thermostatic bath which was increased at a constant rate, the temperature of the cold storage material composition changed, as shown in FIG. 1(*a*), in the order of the following (1) to (3): (1) The temperature of the cold storage material composition increased at a constant rate; (2) after temperature $T_1$, there was little change due to latent heat of the cold storage material composition, and the temperature of the cold storage material composition stayed constant from the temperature $T_1$ to temperature $T_2$; and (3) the temperature of the cold storage material composition started increasing again after the temperature $T_2$. In the present specification, a midpoint between the temperature $T_1$ and the temperature $T_2$, i.e., temperature $T_3$, is defined herein as "melting temperature". In regard to the evaluation of the melting temperature, a cold storage material composition having the melting temperature of not more than −55° C. was rated as "G" (Good), and a cold storage material composition having the melting temperature of more than −55° C. was rated as "P" (Poor).

<Fixed-Temperature Maintainability>

In a temperature change plot of the cold storage material composition which plot was obtained in the course of temperature increase in the ultracold aluminum block thermostatic bath, results of evaluations as to whether the cold storage material composition had fixed-temperature maintainability in the aforementioned definition were provided in Tables below. Specifically, a state in which the temperature of the cold storage material composition was maintained, in a period of time from the melting start temperature $T_1$ to the melting end temperature $T_2$, in a range from the melting start temperature $T_1$ to a temperature 3.0° C. higher than the melting start temperature $T_1$ due to the action of latent heat of the cold storage material composition was defined as "fixed-temperature maintenance". In a case where the cold storage material composition exhibited the fixed-temperature maintenance, the cold storage material composition was regarded as having fixed-temperature maintainability. In regard to the evaluation of fixed-temperature maintainability, the cold storage material composition having fixed-temperature maintainability was rated as "G", and the cold storage material composition having no fixed-temperature maintainability was rated as "P".

<Duration>

In the temperature change plot of the cold storage material composition which plot was obtained in the course of temperature increase in the ultracold aluminum block thermostatic bath, a duration of a fixed-temperature maintaining state (in other words, a period of time from the melting start temperature $T_1$ to the melting end temperature $T_2$) was measured. In a case where the cold storage material composition had no fixed-temperature maintainability, the duration was evaluated as zero (0) minute. Further, in regard to the evaluation as to the duration, in a case where the duration was shorter than 5 minutes, the cold storage material composition was rated as P. In a case where the duration was not shorter than 5 minutes and shorter than 16 minutes, the cold storage material composition was rated as "G". In a case where the duration was not shorter than 16 minutes, the cold storage material composition was rated as "E" (Excellent).

<Solidification Start Temperature, Difference Between Solidification Start Temperature and Melting Temperature, and Period of Time to Solidification Start>

The above-described temperature increase/decrease test was carried out, and a change over time in temperature of the cold storage material composition in the thermostatic bath as measured in the course of the temperature decrease of the thermostatic bath in the temperature increase/decrease test was plotted. As a result of the plotting, a graph as shown in FIG. 1(*b*) was demonstrated for the cold storage material compositions in Examples 3 to 7 and in Comparative Examples 1 to 4 and 6 to 9. Further, a graph as shown in FIG. 1(*c*) was demonstrated for the cold storage material compositions in Examples 1, 2, and 8 to 11 and in Comparative Example 5.

In comparison with the temperature of the thermostatic bath which was decreased at a constant rate, the temperatures of the cold storage material compositions in Examples 3 to 7 and in Comparative Examples 1 to 4 and 6 to 9 changed, as shown in FIG. 1(*b*), in the order of the following (1) to (3): (1) The temperature of the cold storage material composition decreased to temperature $T_6$ at a constant rate; (2) after the temperature of the cold storage material composition had slightly increased from the temperature $T_6$, there was little change at about temperature $T_4$ due to latent heat of the cold storage material composition, and thereafter, the temperature of the cold storage material composition decreased from the temperature $T_4$ to temperature $T_5$; and (3) the temperature of the cold storage material composition decreased at a constant rate after the temperature $T_5$. In the present specification, the temperature $T_6$ is defined as "solidification start temperature". Further, a "difference between the melting temperature and the solidification start temperature" was calculated.

In comparison with the temperature of the thermostatic bath which was decreased at a constant rate, the temperatures of the cold storage material compositions in Examples 1, 2, and 8 to 11 and in Comparative Example 5 changed, as shown in FIG. 1(*c*), in the order of the following (1) to (5): (1) The temperature of the cold storage material composition decreased to about −80° C. at a constant rate; (2) after having reached about −80° C., the temperature of the cold storage material composition maintained at about −80° C. for a certain period of time; (3) after an elapse of the certain period of time, the cold storage material composition exhibited a temperature increase and a temperature decrease with the temperature $T_4$ as a peak; (4) the temperature of the cold storage material composition maintained again at about −80° C. for a certain period of time; and (5) after an elapse of the certain period of time, the temperature of the cold storage material composition increased. In the present specification, a point in time when the period (2) starts in FIG. 1(*c*), i.e. when the cold storage material composition starts maintaining about −80° C. for the certain period of time, is defined as "fixed-temperature maintenance start". Further, a point in time when the period (3) starts, i.e. when the temperature increase with the temperature $T_4$ as a peak starts, is defined as "solidification start", and the temperature at such a point in time is defined as "solidification start temperature" and is regarded as the temperature $T_6$. Further, a duration of the period (2) and the period (3), i.e. a period from the "fixed-temperature maintenance start" to the "solidification start", is defined as a "period of time from the fixed-temperature maintenance start to the solidification start". On the cold storage material compositions in Examples 1, 2, and 8 to 11 and the cold storage material composition in Comparative Example 5, the "period of time from the fixed-temperature maintenance start to the solidification start" was measured, and the "difference between the melting temperature and the solidification start temperature" was calculated.

<Practicality Evaluation>

Practicality was evaluated on a four-level scale: AAA (very excellent); AA (excellent); A (good); and P (poor), which are based on the following criteria (a larger number of "A" indicates more excellent practicability):

AAA: (i) The solidification start temperature is not less than −79.0° C., or a period of time to the solidification start is not more than 210 minutes, (ii) the duration is not less than 17 minutes, and (iii) the difference between the melting temperature and the solidification start temperature is not more than 6.0° C.

AA: (i) The solidification start temperature is not less than −79.0° C., or a period of time before the solidification start is not more than 210 minutes, (ii) the duration is not less than 15 minutes, and (iii) the difference between the melting temperature and the solidification start temperature is more than 6.0° C. and not more than 13.0° C.

A: (i) The solidification start temperature is not less than −79.0° C., or a period of time to the solidification start is not more than 210 minutes, (ii) the duration is not less than 15 minutes, and (iii) the difference between the melting temperature and the solidification start temperature is more than 13.0° C. and not more than 16.0° C.

P: (i) The solidification start temperature is less than −79.0° C., (ii) a period of time to the solidification start is more than 210 minutes, and (iii) the rating of "P" is given in any of the other categories.

<Test Results>

The test results are shown in Tables 1 and 2. Note that "Blended amount" of each of the materials shown in Tables 1 and 2 indicates "molar quantity" of each of the materials contained in the obtained cold storage material composition.

TABLE 1

| | | | | Ex. 1 | Ex. 2 | Ex. 3 | Ex. 4 | Ex. 5 | Ex. 6 |
|---|---|---|---|---|---|---|---|---|---|
| Blended amounts | Calcium chloride | | Number of moles relative to 100 mol of water | 4 | 4 | 4 | 4 | 4 | 4 |
| | Calcium bromide | | | 5 | 5 | 5 | 5 | 5 | 5 |
| | Ammonium chloride | | | 1 | 1.5 | 2 | 2.5 | 3 | 3.5 |
| | Ammonium bromide | | | — | — | — | — | — | — |
| | Sodium chloride | | | — | — | — | — | — | — |
| | Hydroxyethyl cellulose | | % by weight relative to aqueous solution (100% by weight) containing materials other than hydroxyethyl cellulose | — | — | — | — | — | — |
| Ion concentration | Calcium ion ($Ca^{2+}$) | | Number of moles relative to 100 mol of water | 9 | 9 | 9 | 9 | 9 | 9 |
| | Chloride ion ($Cl^-$) | | | 9 | 9.5 | 10 | 10.5 | 11 | 11.5 |
| | Bromide ion ($Br^-$) | | | 10 | 10 | 10 | 10 | 10 | 10 |
| | Ammonium ion ($NH_4^+$) | | | 1 | 1.5 | 2 | 2.5 | 3 | 3.5 |
| Filtration temperature | | | ° C. | — | — | — | — | — | — |
| Evaluation results | Rate of temperature increase/decrease: 0.5° C./min | Melting temperature | ° C. | −64.4 | −64.3 | −64.6 | −64.7 | −64.1 | −64.4 |
| | | Fixed-temperature maintainability | — | G | G | G | G | G | G |
| | | Duration | min | 21 | 20 | 20 | 19 | 18 | 18 |
| | | Solidification start temperature | | −79.6 | −79.7 | −77.4 | −70.5 | −68.9 | −65.9 |
| | Difference between melting temperature and solidification start temperature | | ° C. | 15.2 | 15.4 | 12.8 | 5.8 | 4.8 | 1.5 |
| | Period of time from fixed-temperature maintenance start to solidification start | | min | 57.5 | 42.0 | — | — | — | — |

TABLE 1-continued

| | | | | | | | | | |
|---|---|---|---|---|---|---|---|---|---|
| | Melting temperature of not more than −55° C. | | | G | G | G | G | G | G |
| | Practicality evaluation | | | A | A | AA | AAA | AAA | AAA |

| | | | | Ex. 7 | Ex. 8 | Ex. 9 | Ex. 10 | Ex. 11 |
|---|---|---|---|---|---|---|---|---|
| Blended amounts | Calcium chloride | | Number of moles relative to 100 mol of water | 4 | 7 | 7 | 7 | 4 |
| | Calcium bromide | | | 5 | — | — | — | 5 |
| | Ammonium chloride | | | 4 | — | — | — | 2 |
| | Ammonium bromide | | | — | 8.5 | 8.5 | 8.5 | — |
| | Sodium chloride | | | — | — | — | — | — |
| | Hydroxyethyl cellulose | | % by weight relative to aqueous solution (100% by weight) containing materials other than hydroxyethyl cellulose | — | — | — | — | 0.6 |
| Ion concentration | Calcium ion ($Ca^{2+}$) | | Number of moles relative to 100 mol of water | 9 | — | — | 7 | 9 |
| | Chloride ion ($Cl^-$) | | | 12 | — | — | 10 | 10 |
| | Bromide ion ($Br^-$) | | | 10 | — | — | 6 | 10 |
| | Ammonium ion ($NH_4^+$) | | | 4 | — | — | 2 | 2 |
| Filtration temperature | | | ° C. | — | 30 | 0 | −20 | — |
| Evaluation results | Rate of temperature increase/decrease: 0.5° C./min | Melting temperature | ° C. | −64.3 | −64.1 | −64.1 | −64.2 | −65.7 |
| | | Fixed-temperature maintainability | — | G | G | G | G | G |
| | | Duration | Min | 17 | 19 | 19 | 21 | 21 |
| | | Solidification start temperature | | −67.2 | −79.8 | −80.0 | −79.8 | −79.1 |
| | Difference between melting temperature and solidification start temperature | | ° C. | 2.9 | 15.7 | 15.9 | 15.6 | 13.4 |
| | Period of time from fixed-temperature maintenance start to solidification start | | Min | — | 35.8 | 94.5 | 159.5 | 97.0 |
| | Melting temperature of not more than −55° C. | | | G | G | G | G | G |
| | Practicality evaluation | | | AAA | A | A | A | A |

Table 1 shows test results of Examples 1 to 11. All of the cold storage material compositions prepared in Examples 1 to 11 contain water, calcium ions, chloride ions, bromide ions, and ammonium ions. Further, as a result of ion chromatography, it was found that, in the cold storage material composition in Example 10, in the cooling step in the course of production, not only ammonium chloride, but also ammonium bromide were deposited, and not only the deposited ammonium chloride, but also the deposited ammonium bromide were removed.

In Examples 1 to 11, the cold storage material composition solidified at −80° C. had the melting temperature of −75° C. to −55° C. and was evaluated to be good in the "fixed-temperature maintainability". Further, in Examples 3 to 7, the solidification start temperature of the cold storage material composition was not less than −79.0° C., the "duration" was not less than 15 minutes, and the difference between the melting temperature and the solidification start temperature was not more than 13.0° C. or was not more than 6.0° C. Therefore, the cold storage material compositions in Examples 3 to 7 were rated as AA or AAA in the "practicality evaluation". Further, in Examples 1, 2, and 8 to 11, the solidification start temperature of the cold storage material composition was less than −79.0° C., the "period of time to the solidification start" was within 210 minutes, the "duration" was not less than 15 minutes, and the "difference between the melting temperature and the solidification start temperature" was not more than 16° C. Therefore, the cold storage material compositions in Examples 1, 2, and 8 to 11 were rated as A in the "practicality evaluation".

In Examples 1 to 7, it was found that, with increase in the amount of ammonium ions contained in the cold storage material composition, the solidification start temperature increases, and the duration decreases.

TABLE 2

| | | | | Com. Ex. 1 | Com. Ex. 2 | Com. Ex. 3 |
|---|---|---|---|---|---|---|
| Blended amounts | Calcium chloride | | Number of moles relative to 100 mol of water | 6 | — | — |
| | Calcium bromide | | | — | 3.9 | — |
| | Ammonium chloride | | | — | — | 12 |
| | Ammonium bromide | | | — | — | — |
| | Sodium chloride | | | — | — | — |
| Ion concentration | Calcium ion ($Ca^{2+}$) | | Number of moles relative to 100 mol of water | 6 | 3.9 | 0 |
| | Chloride ion ($Cl^-$) | | | 12 | 0 | 12 |
| | Bromide ion ($Br^-$) | | | 0 | 7.8 | 0 |
| | Ammonium ion ($NH_4^+$) | | | 0 | 0 | 12 |
| Filtration temperature | | | ° C. | — | — | — |
| Evaluation results | Rate of temperature increase/decrease: 0.5° C./min | Melting temperature | ° C. | −51.5 | −17.0 | −15.1 |
| | | Fixed-temperature maintainability | — | G | P | G |
| | | Duration | min | 22 | 0 | 34 |
| | | Solidification start temperature | — | — | — | — |
| | Difference between melting temperature and solidification start temperature | | ° C. | — | — | — |

TABLE 2-continued

| | | | | | | |
|---|---|---|---|---|---|---|
| | Period of time from fixed-temperature maintenance start to solidification start | | min | — | — | — |
| | Melting temperature of not more than −55° C. | | | P | P | P |
| | Practicality evaluation | | | P | P | P |

| | | | | Com. Ex. 4 | Com. Ex. 5 | Com. Ex. 6 |
|---|---|---|---|---|---|---|
| Blended amounts | Calcium chloride | | Number of moles relative to 100 mol of water | — | 4 | 4 |
| | Calcium bromide | | | — | 5 | — |
| | Ammonium chloride | | | — | — | 4 |
| | Ammonium bromide | | | 6.1 | — | — |
| | Sodium chloride | | | — | — | — |
| Ion concentration | Calcium ion ($Ca^{2+}$) | | Number of moles relative to 100 mol of water | 0 | 9 | 4 |
| | Chloride ion ($Cl^-$) | | | 0 | 8 | 12 |
| | Bromide ion ($Br^-$) | | | 6.1 | 10 | 0 |
| | Ammonium ion ($NH_4^+$) | | | 6.1 | 0 | 4 |
| Filtration temperature | | | ° C. | — | — | — |
| Evaluation results | Rate of temperature increase/decrease: 0.5° C./min | Melting temperature | ° C. | −16.0 | −65.2 | −52.1 |
| | | Fixed-temperature maintainability | — | G | G | G |
| | | Duration | min | 28 | 18 | 15 |
| | | Solidification start temperature | — | — | — | — |
| | Difference between melting temperature and solidification start temperature | | ° C. | — | — | — |
| | Period of time from fixed-temperature maintenance start to solidification start | | min | — | — | — |
| | Melting temperature of not more than −55° C. | | | P | G | P |
| | Practicality evaluation | | | P | P | P |

| | | | | Com. Ex. 7 | Com. Ex. 8 | Com. Ex. 9 |
|---|---|---|---|---|---|---|
| Blended amounts | Calcium chloride | | Number of moles relative to 100 mol of water | 2 | 6 | 4 |
| | Calcium bromide | | | — | — | — |
| | Ammonium chloride | | | 5 | — | — |
| | Ammonium bromide | | | — | — | — |
| | Sodium chloride | | | — | 2 | 4 |
| Ion concentration | Calcium ion ($Ca^{2+}$) | | Number of moles relative to 100 | 2 | 6 | 4 |
| | Chloride ion ($Cl^-$) | | mol of water | 9 | 14 | 12 |
| | Bromide ion ($Br^-$) | | | 0 | 0 | 0 |
| | Ammonium ion ($NH_4^+$) | | | 5 | 0 | 0 |
| Filtration temperature | | | ° C. | — | — | — |
| Evaluation results | Rate of temperature increase/decrease: 0.5° C./min | Melting temperature | ° C. | −52.1 | −50.7 | −50.5 |
| | | Fixed-temperature maintainability | — | G | G | G |
| | | Duration | Min | 11 | 25.0 | 18.0 |
| | | Solidification start temperature | | — | — | — |
| | Difference between melting temperature and solidification start temperature | | ° C. | — | — | — |
| | Period of time from fixed-temperature maintenance start to solidification start | | Min | — | — | — |
| | Melting temperature of not more than −55° C. | | | P | P | P |
| | Practicality evaluation | | | P | P | P |

Table 2 shows test results of Comparative Examples 1 to 9. In comparative Examples 1 to 9, at least one of calcium ions, chloride ions, bromide ions, and ammonium ions is not contained. The cold storage material compositions in Comparative Examples 1 to 4 are cold storage material compositions which contain water and a single inorganic salt. When the cold storage material compositions in Comparative Examples 1 to 4 are solidified at −80° C., the melting temperatures do not become not more than −55° C. The cold storage material compositions in Comparative Examples 6 and 7 are compositions, which contain water, a calcium salt, a chloride salt, and an ammonium salt, but contain no bromide salt. When the cold storage material compositions in Comparative Examples 6 and 7 are solidified at −80° C., the melting temperatures do not become not more than −55° C. The cold storage material compositions in Comparative Examples 8 and 9 are compositions, which contain water, a calcium salt, a chloride salt, and a sodium salt, but contain no bromide salt and no ammonium salt. When the cold storage material compositions in Comparative Examples 8 and 9 are solidified at −80° C., the melting temperatures do not become not more than −55° C.

The cold storage material composition in Comparative Example 5 is a composition, which contains water, a calcium salt, a chloride salt, and a bromide salt, but contains no ammonium salt. The composition in Comparative Example 5 has the melting temperature of not more than −55° C., but has the period of time to the solidification start that is as long as 216.5 minutes. This means that the composition in Comparative Example 5 cannot be solidified in a short time. Therefore, the composition in Comparative Example 5 is not practical.

INDUSTRIAL APPLICABILITY

A cold storage material composition according to one or more embodiments of the present disclosure, a cold storage material including the cold storage material composition, a transport container, and a cold storage material composition produced by a method of producing a cold storage material composition according to one or more embodiments of the present disclosure, each allow a temperature control target article whose control temperature is in a range of −75° C. to −55° C. to be stored or transported at its control temperature under a specific environment. Further, a method of using a cold storage material composition according to one or more embodiments of the present disclosure, allows a temperature control target article whose control temperature is in a range of −75° C. to −55° C. to be stored or transported at its control temperature under a specific environment. Thus, one or more embodiments of the present disclosure are suitably applicable to storage and transport of articles such as cells, pharmaceutical products, regenerative cells, specimens, food, and the like.

The invention claimed is:

1. A cold storage material composition, comprising 7.0 mol to 9.0 mol of calcium ions, 9.0 mol to 12.0 mol of chloride ions, 6.0 mol to 10.0 mol of bromide ions, and 1.0 mol to 4.0 mol of ammonium ions, relative to 100 mol of water, wherein the cold storage material composition has a melting temperature in a range of −75° C. to −55° C.

2. The cold storage material composition as set forth in claim 1, wherein the cold storage material composition has a solidification start temperature of not less than −80° C.

3. The cold storage material composition as set forth in claim 2, wherein a difference between the melting temperature and the solidification start temperature is not more than 16° C.

4. The cold storage material composition as set forth in claim 2, wherein a difference between the melting temperature and the solidification start temperature is not more than 6° C.

5. A method of producing the cold storage material composition as set forth in claim 1, the method comprising a mixing step forming a mixture in which water, calcium chloride, calcium bromide, and ammonium chloride are mixed.

6. A method of producing a cold storage material composition, comprising a mixing step forming any one of the following mixtures (A) through (F):

(A) a mixture in which water, calcium chloride, and ammonium bromide are mixed;

(B) a mixture in which water, ammonium chloride, and calcium bromide are mixed;

(C) a mixture in which water, calcium chloride, a bromide salt, and an ammonium salt are mixed;

(D) a mixture in which water, calcium bromide, a chloride salt, and an ammonium salt are mixed;

(E) a mixture in which water, ammonium chloride, a calcium salt, and a bromide salt are mixed; and (F) a mixture in which water, a calcium salt, a chloride salt, a bromide salt, and an ammonium salt are mixed and, after the mixing step, a cooling step comprising cooling the mixture to deposit ammonium chloride and to remove the deposited ammonium chloride.

7. The method as set forth in claim 6, wherein the cooling step is carried out at a temperature of not less than −40° C. and wherein the temperature at which the cooling step is lower than a temperature at which the mixing step is carried out.

* * * * *